US012681580B2

(12) United States Patent
Sone et al.

(10) Patent No.: US 12,681,580 B2
(45) Date of Patent: Jul. 14, 2026

(54) SKIN STIMULATION DEVICE AND METHOD FOR DRIVING SKIN STIMULATION DEVICE

(71) Applicant: Junji Sone, Chigasaki (JP)

(72) Inventors: Junji Sone, Chigasaki (JP); Liwei Lin, Berkeley, CA (US); Tatsuya Sato, Yokohama (JP); Shimmyo Yanagawa, Tokyo (JP)

(73) Assignee: Junji Sone, Chigasaki (JP)

( * ) Notice: Subject to any disclaimer, the term of this patent is extended or adjusted under 35 U.S.C. 154(b) by 0 days.

(21) Appl. No.: 18/844,248

(22) PCT Filed: Mar. 7, 2022

(86) PCT No.: PCT/JP2022/009621
§ 371 (c)(1),
(2) Date: Sep. 5, 2024

(87) PCT Pub. No.: WO2023/170729
PCT Pub. Date: Sep. 14, 2023

(65) Prior Publication Data
US 2025/0181167 A1 Jun. 5, 2025

(51) Int. Cl.
*G06F 3/01* (2006.01)
(52) U.S. Cl.
CPC .............. *G06F 3/016* (2013.01); *G06F 3/014* (2013.01)
(58) Field of Classification Search
CPC ......... G06F 3/016; G06F 3/014; A61B 34/35; A61B 34/37; A61B 34/76
See application file for complete search history.

(56) References Cited

U.S. PATENT DOCUMENTS

2007/0086145 A1* 4/2007 Kubota .................. H05K 1/186
257/E23.079
2009/0303195 A1* 12/2009 Yamato ................. G06F 3/0443
345/173
(Continued)

FOREIGN PATENT DOCUMENTS

JP 2015-115078 A 6/2015
JP 2015-179544 A 10/2015
(Continued)

OTHER PUBLICATIONS

International Search Report and Written Opinion, dated Apr. 19, 2022, for the corresponding patent application No. PCT/JP2022/009621, with English translation, 13 pages.
(Continued)

*Primary Examiner* — Towfiq Elahi
(74) *Attorney, Agent, or Firm* — LUCAS & MERCANTI, LLP

(57) ABSTRACT

A skin-stimulating device for imparting a stimulus to the skin, includes: a first film that bends when a voltage is applied; a plurality of first film-form electrodes provided on one surface of the first film so as to be separated from one another by a prescribed spacing; a second film that bends when a voltage is applied; a second film-form electrode provided on one surface of the second film; and a dielectric member molded from a dielectric rubber in the shape of a thin sheet in which a hole is opened, with other surface of the first film being affixed to a first surface that is a prescribed surface of the dielectric member, and the other surface of the second film being affixed to a second surface on the reverse side from the first surface.

15 Claims, 8 Drawing Sheets

(56)             References Cited

U.S. PATENT DOCUMENTS

2010/0307900 A1* 12/2010 Choi ..................... H01H 13/85
                                                                200/330
2015/0169118 A1*  6/2015 Lee ....................... G06F 3/0445
                                                                345/174

FOREIGN PATENT DOCUMENTS

JP          2018-531512 A     10/2018
WO          2015/076321 A1     5/2015

OTHER PUBLICATIONS

H. Kajimoto, Electro-tactile display with real-time impedance feed-
back using pulse width modulation, IEEE Trans. Haptics, 5 (2),
(2012), 184-188.
Weichen Wang, et al., Strain-insensitive intrinsically stretchable
transistors and circuits, Nature Electronics vol. 4, pp. 143-150
(2021).

* cited by examiner

SKIN STIMULATION DEVICE AND METHOD FOR DRIVING SKIN STIMULATION DEVICE

CROSS REFERENCE TO RELATED APPLICATION

This Application is a 371 of PCT/JP2022/009621 filed on Mar. 7, 2022, and the above application is incorporated herein by reference.

TECHNICAL FIELD

This invention relates to skin stimulation devices and methods of driving skin stimulation devices, and in particular to skin stimulation devices that apply stimulation to the skin and methods of driving skin stimulation devices.

BACKGROUND TECHNOLOGY

Tactile and force feedback are important for surgical systems and teleoperation tasks. There are numerous products for Braille displays, and tactile devices have been studied. Tactile displays require high density and fast response to achieve the teleoperation and virtual reality that braille codes display. One of these tactile displays has been realized using magnetic microactuators based on PDMS (polydimethylsiloxane) elastomers.

Although these tactile displays have achieved high density and high speed, the forces generated are weak. Ion-conductive polymer gel membrane actuators have achieved high density and high speed displays in wet conditions, but wet conditions are problematic. When dry, they stop working because the ions do not move.

Shape memory alloy actuators are one possible solution, but they do not have sufficient response time for use in tactile devices. High-resolution displays using smart hydrogels have also been developed, but the response time is insufficient for tactile sensation. Similar polymer actuators have been developed using dielectric elastomers to achieve soft, flexible, and thin actuators that can be used in wearable devices, but cannot present pressure sensation.

Tactile generation devices that array multiple ultrasonic transducers create tactile sensation at or near a single point of vibration stimulation from multiple transducers at a distant distance, but they are large devices that require high-power drives, making it difficult to generate tactile sensation at multiple points. Some pseudo-haptic devices use electrical stimulation and change tactile sensation depending on polarity (see, for example, Non-Patent Document 1). Others use air jets or suction, but are difficult to use as wearable devices because the devices are large and interfere with hand work.

Someya et al. also worked on the realization of a system that can be attached to human tissues and body surfaces to measure biological information without interfering with biological motion. By forming organic devices on ultra-thin polymer film only about one micrometer thick, they succeeded in creating an ultra-thin yet surprisingly durable flexible organic device. The fabricated soft organic transistor integrated circuits, which are the world's lightest and thinnest, maintain their electrical performance and are mechanically unbreakable even when the film is bent and crushed to a radius of curvature of 5 micrometers. Someya et al. have successfully fabricated a prototype soft touch sensor system using this organic transistor integrated circuit.

Furthermore, a similar sensor has been studied at Stanford University, but without actuator function (see, for example, Non-Patent Document 2).

PRIOR ART DOCUMENT

Patent Documents

Non-Patent Document 1: H. Kajimoto, Electro-tactile display with real-time impedance feedback using pulse width modulation, IEEE Trans. Haptics, 5 (2), (2012), 184-188.
Non-Patent Document 2: Weichen Wang,. Zhenan Bao, Strain-insensitive intrinsically stretchable transistors and circuits, Nature Electronics volume 4, pages 143-150 (2021)

SUMMARY OF INVENTION

Problem to be Solved by the Invention

Thus, tactile sensation is created mainly by vibration and pin up and down, but due to low generation density, slow response speed, and large mechanical structure of the drive mechanism, it was difficult to attach the device to the human body without interfering with a person's free work.

The present invention was made in view of this situation, and is thinner and more flexible, so that tactile stimuli can be applied to a desired part of the skin area at a desired time and for a desired period of time, causing a tactile sensation.

Means to Solve the Problem

A skin stimulation device of an aspect of the present invention is a skin stimulation device that applies stimulation to the skin, comprising: a first film that bends when a voltage is applied, a plurality of membrane-shaped first electrodes provided on one side of the first film at a predetermined distance from each other, a second film that bends when a voltage is applied a membrane-shaped second electrode provided on one side of the second film, and a dielectric member molded of dielectric rubber in the form of a thin plate having holes formed therein, the other side of the first film being attached to the first side, which is a predetermined surface, and the other side of the second film being attached to the second side, a capacitor material is placed in the hole formed in the dielectric member to assist in the accumulation of electric charge, which is opposite the first side and when an AC drive voltage is applied between any or all of the first electrode and the second electrode, the portion sandwiched between the first and second electrodes to which the voltage is applied vibrates.

The spacing between the plurality of first electrodes on one side of the first film can be less than the two-point identification threshold of human skin.

The charge can be precharged by applying a predetermined voltage to the dielectric material.

Holes in the dielectric material can be made to penetrate from the first surface to the second surface.

Any of the plurality of first electrodes and the second electrode can be positioned across the first film and the second film to sandwich the portion of the dielectric material in which the holes are formed.

The shape of the cross section on the first face of the hole in the dielectric material can be the same as the shape of the face of the first electrode in membrane form.

The first electrode can be positioned across the first film and on the cross-section of the hole in the dielectric material, in the first plane.

Any of the plurality of first electrodes and the second electrode can be positioned across the first and second films to sandwich the portion of the dielectric material that is out of the area where the holes are formed.

Pressing means can be further provided to press between the edges of the first film, the second film and the dielectric member.

A plurality of second electrodes can be provided, and each of the plurality of second electrodes can be located opposite each of the plurality of first electrodes.

When the vibration is transmitted as a stimulus in contact with the skin, further pressing means can be provided to displace and press the first film, first electrode, second film, second electrode and dielectric member against the skin.

The pressing means can be made to press against the skin by displacing the first film, first electrode, second film, second electrode and dielectric member by gas or liquid pressure.

The pressing means can be made to press the first film, first electrode, second film, second electrode and dielectric member against the skin by displacing them with a cam.

The pressing means can be pulled by a wire through a pulley to displace the first film, first electrode, second film, second electrode and dielectric member to press them against the skin.

One aspect of the present invention is a method for driving a skin stimulation device for applying stimulation to the skin. A second film that bends when a voltage is applied, a film-shaped second electrode provided on one side of the second film, and a dielectric member molded of dielectric rubber in the form of a thin plate having holes formed therein, the other side of the first film being attached to the first side, which is a predetermined surface, and the other side of the second film being attached to the second side opposite the first side. The skin stimulation device includes a dielectric member to which the other side of the second film is attached on the second side opposite the first side, a capacitor material is placed in the hole formed in the dielectric member to assist in the accumulation of electric charge and wherein when an AC drive voltage is applied between any or all of the first electrodes and the second electrodes, the portion sandwiched between the first and second electrodes to which the voltage is applied vibrates. The vibrating portion is vibrated by applying a voltage of alternating current with a frequency of between 30 Hz and 500 Hz.

Effects of the Invention

As described above, the present invention allows for thinner and more flexible stimulation that causes tactile sensations to be applied to a desired part of the skin site at a desired time and for a desired period of time.

FORMS FOR CARRYING OUT THE INVENTION

The following is a description of the skin stimulation device of the present invention with reference to FIGS. 1 through 11.

Figure 1:
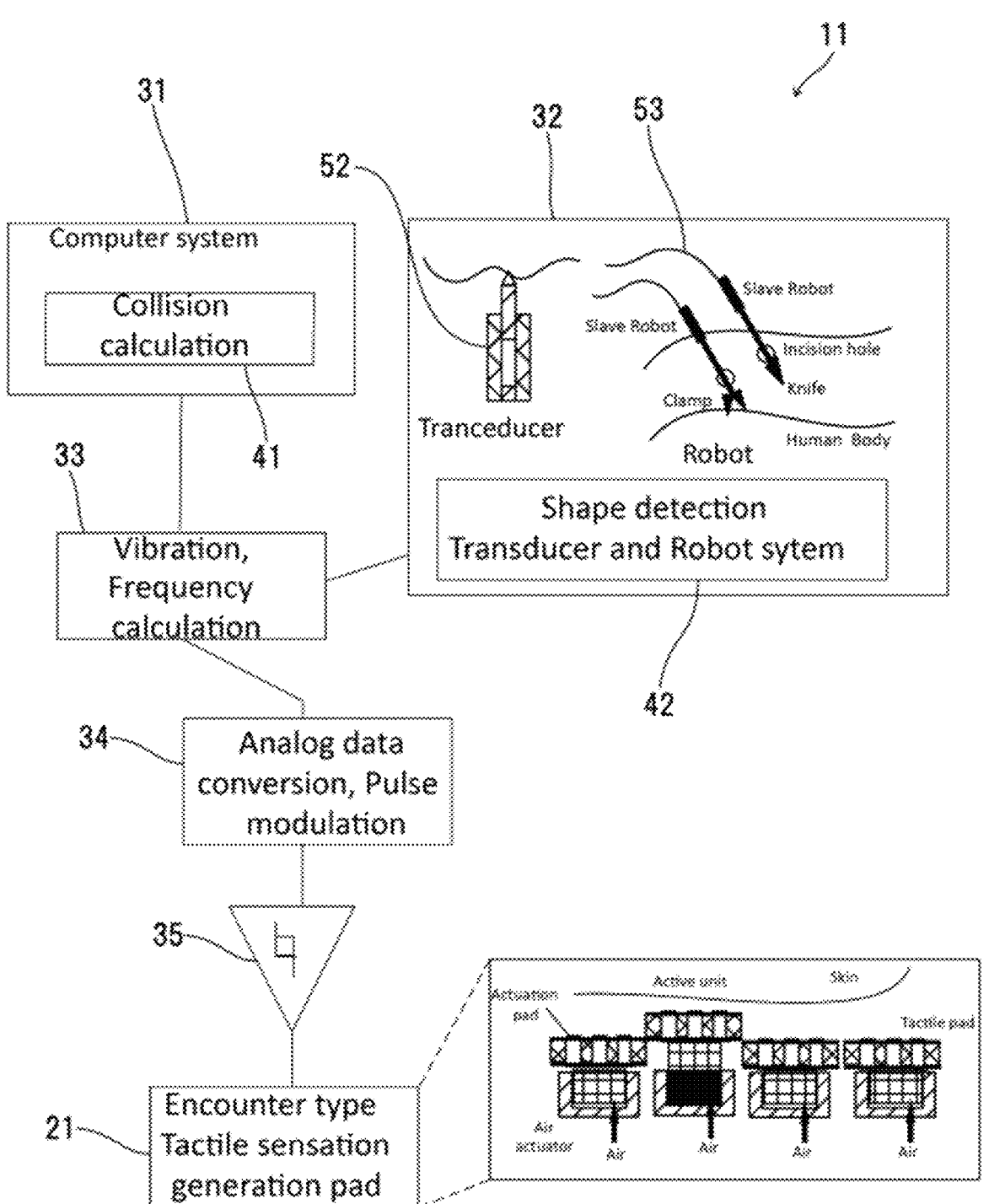
FIG. 1 shows a block diagram of each level of the tactile sensation presentation system 11, including a tactile sensation generating pad, which is an example of a skin stimulation device.

FIG. 1 shows a block diagram of each level of the tactile presentation system 11, including a tactile generating pad, which is an example of a skin stimulation device. The tactile presentation system 11 includes a virtual reality computer system and a teleoperation system. The tactile presentation system 11 produces calculated or detected tactile sensations in humans. That is, the tactile presentation system 11 calculates or detects tactile sensations and applies stimuli to human skin to perceive the calculated or detected tactile sensations. The skin to which the stimulation is applied can be human or animal.

The tactile presentation system 11 comprises a computer system 31, a tactile detection system 32, a vibration frequency calculation unit 33, a digital data/analog data conversion unit 34, an amplifier 35, and a group of tactile generating pads 21. Computer system 31 includes and comprises a computer to calculate contact or collision with the skin. Computer system 31 includes a collision calculation section 41. The collision calculation section 41 is implemented by a computer executing a predetermined program to calculate human contact or collision, real or virtual. For example, the collision calculation section 41 calculates the avatar's contact or collision with other avatars or objects in the virtual space according to the avatar's movements in the virtual space. For example, the collision calculation section 41 calculates tactile information, such as tactile, pressure or vibration sensations of other avatars or objects when the avatar contacts or collides with other avatars or objects in the virtual space. Computer system 31 supplies the calculated tactile information to vibration frequency calculation section 33.

For example, tactile and pressure sensations are sensations caused by weak mechanical stimuli applied to the skin surface. For example, tactile sensation is a sensation based on receptors in the skin that generate a large number of impulses immediately after a stimulus is applied. Pressure, for example, is a sensation based on receptors that continuously generate impulses during the period of stimulation. For example, vibration sensation is a sensation produced by repetitive stimulation of tens to hundreds of Hz.

The tactile detection system 32 detects tactile sensations. The tactile detection system 32 includes a shape detection transducer and a robotic system 42. The shape detection transducer and robotic system 42 detects tactile sensations according to shape or tactile information at work. Shape detection transducer and robotic system 42 includes transducer 52 or remote robotic system 53. The transducer 52 traces the surface of the object and detects tactile sensations according to the shape of the object. The remote robot system 53 detects tactile information from the end-effector (tool) of a robot that is remotely operated by a human during work. For example, the remote robot system 53 detects tactile information from a tool, such as a medical teleoperated robot, which is a knife or clamp. For example, the remote robot system 53 detects tactile information such as tactile, pressure or vibration sensations when touching a human body with a tool that is a knife or clamp. The tactile detection system 32 provides the detected tactile information to the vibration frequency calculation unit 33.

Thus, tactile information indicating tactile, pressure or vibration sensations is generated from work simulations in virtual reality environments, tactile data measured by remote robots, image data, etc.

The vibration frequency calculation section 33 consists of a computer executing a predetermined program or dedicated equipment, etc., and calculates the vibration amount and frequency to perceive the tactile sensation from the tactile information supplied by the computer system 31 or the tactile detection system 32. For example, when the tactile information supplied by computer system 31 or tactile detection system 32 is tactile information indicating tactile, pressure, or vibration sensation, vibration frequency calculation section 33 calculates the force, vibration amount, and frequency according to the tactile sensation, calculates the vibration amount and frequency according to the pressure sensation, and The vibration amount and frequency are calculated according to the vibration sense. The vibration frequency calculation section 33 supplies digital data indicating the calculated vibration amount and frequency to the digital data/analog data conversion section 34.

The digital data/analog data conversion section 34 converts digital data indicating the vibration amount and frequency supplied by the vibration frequency calculation section 33 into analog data. For example, the digital data/analog data conversion section 34 converts digital data indicating vibration amount and frequency into analog data by frequency modulation. The digital data/analog data conversion section 34 supplies the analog data indicating the vibration amount and frequency obtained by the conversion to the amplifier 35.

Amplifier 35 consists of a power amplifier and a control output generator, and amplifies the analog data indicating the vibration amount and frequency supplied from digital data/analog data converter 34 to generate a control output of the pressure to press the corresponding tactile sensation generating pad against the skin from among a plurality of tactile sensation generating pads, and supplies it to tactile sensation generation pad group 21.

The tactile sensation generating pad group 21 is composed of a plurality of tactile sensation generating pads and an actuator that presses a given tactile sensation generating pad against the skin. The tactile sensation generating pad group 21 is created by MEMS (Micro Electro Mechanical Systems), ultra-precision machining, 3D printing technology (3D modeling technology), and precision lamination technology. The tactile pads 21 are attached to the skin of the body, such as fingers, palms, backs of hands, wrists, elbows, shoulders, chest, back, or hips, by means of a fixation band, harness, gloves, or clothing. For example, the shape of the tactile sensation generating pad group 21 is a surface shape corresponding to the palm side surface of the terminal segment of the second finger (index finger) and is between 0.2 mm and 0.5 mm thick. For example, the shape of the tactile sensation generating pad group 21 is between 0.2 mm and 0.5 mm thick with a surface shape corresponding to the palm side surface of the right hand. The tactile sensation generating pad group 21 is driven by the amplifier 35 to generate stimuli that produce tactile, pressure, or vibration sensations, and to transmit the stimuli to the skin at the desired site among the skin sites. The tactile generating pad group 21 applies stimuli that cause tactile, pressure or vibration sensations to the desired area of the skin at the desired timing. In other words, the tactile generating pad group 21 applies stimuli that cause tactile and pressure sensations to the desired area of skin, among the areas of skin, at the desired time and for the desired duration.

The tactile generating pad group 21 can selectively generate stimuli that produce tactile sensations over one or more of the tactile generating pads 73, which are tactile presentation units described below, in response to tactile information, and can also produce pressure sensations simultaneously.

Figure 2:
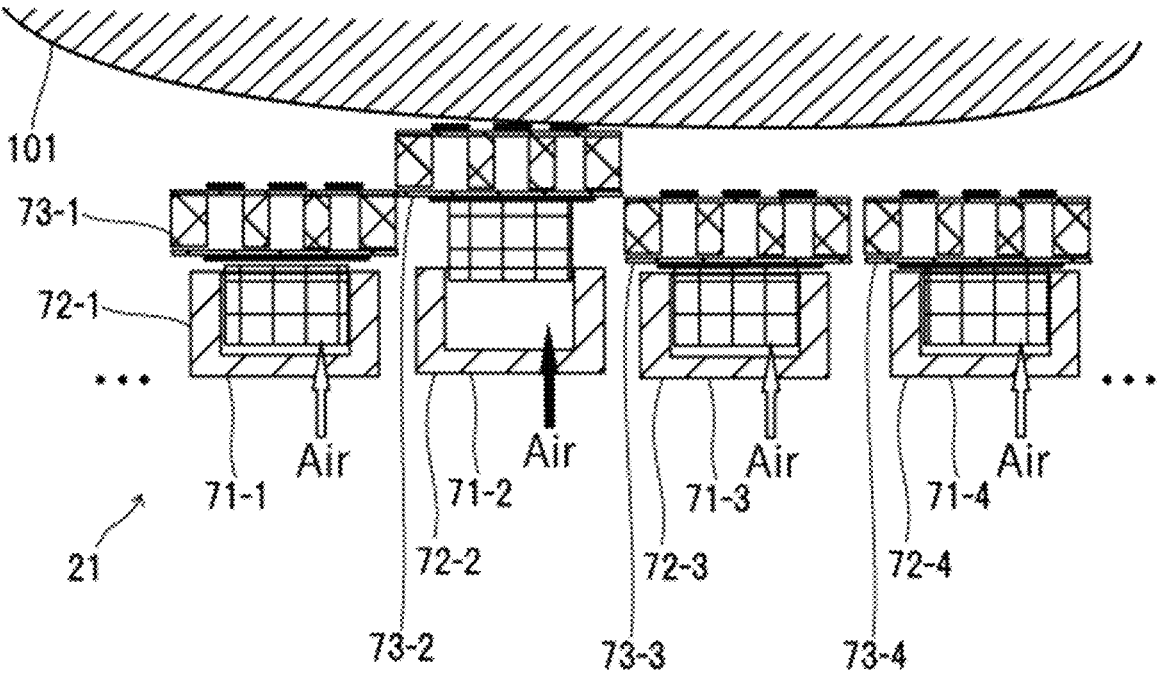
FIG. 2 shows an example of the configuration of the tactile sensation generating pad group 21.

FIG. 2 shows an example of the configuration of the tactile sensation generating pad group 21. The tactile sensation generating pad group 21 is composed of about 3 to 10 tactile sensation generating pads 73. Each of the tactile generating pads 73 has from 10 to 50 tactile generating points. The tactile generating points on the tactile generating pad 73 are arranged in the left-right direction in FIG. 2 and the front-back direction (depth direction) in FIG. 2. In other words, the tactile sensation generating points are arranged two-dimensionally on the surface at predetermined intervals on the skin-contacting side of the tactile sensation generating pad 73.

In the following description, some of the tactile generating points of the tactile generating pads 73 will be used as examples. When the tactile sensation generating pad group 21 transmits stimuli to the skin with a predetermined tactile sensation generating pad 73 among a plurality of tactile sensation generating pads 73 that are lined up, the predetermined tactile sensation generating pad 73 is moved in the direction of the skin 101 so that it contacts a predetermined part of the skin 101 of the body such as fingers, hands and arms.

Hereafter, for example, when four tactile generation pads 73 are included in the tactile generation pad group 21, when distinguishing the tactile generation pads 73 individually, each is referred to as a tactile generation pad 73-1 through 73-4, etc.

FIG. 2 shows an example of the configuration of the tactile sensation generating pad group 21 when four tactile sensation generating pads 73-1 through 73-4 are included. The tactile sensation generating units 71-1 through 71-4 are configured to include each of the air actuators 72-1 through 72-4 and the tactile sensation generating pads 73-1 through 73 4 are configured to include each of the air actuators 72-1 through 72-4 and the tactile sensation generating pads 73-1 through 73-4, respectively. The tactile sensation generating units 71-1 through 71-4 each operate individually and independently to generate stimuli and transmit the generated stimuli to the skin 101.

The tactile sensation generating pad 73-1 has a plurality of electrodes formed on the side of the surface of the tactile sensation generating pad 73-1 that is in contact with the skin 101, as will be described in detail later. Similarly, each of the tactile sensation generating pads 73-2 through 73-4 has a plurality of electrodes are formed.

In each of the tactile generating pads 73-1 through 73-4, the plurality of electrodes formed on the side surface in contact with the skin 101 are tactile generating points that produce stimuli causing tactile and pressure sensations, respectively. The distance between the plurality of electrodes formed on each of the tactile generating pads 73-1 through 73-4 is less than the two-point discrimination threshold of human skin. In other words, the mutual distance between the electrodes is less than the two-point discrimination threshold of human skin. For example, the two-point discrimination threshold of human skin is 1 to 6 mm at the fingertip and 15 to 20 mm at the palm or sole. For example, the two-point discrimination threshold for human skin is 2 to 3 mm at the lips and 30 mm at the palms or soles.

That is, for example, when the tactile sensation generating pads 73-1 through 73-4 are used on the finger tips, the mutual distance between the electrodes is less than 2 mm. For example, when the tactile sensation generating pads 73-1 through 73-4 are used on the palms or soles, the distance between the electrodes is less than 30 mm.

Since the two-point discrimination threshold of human skin is 2 to 3 mm at the lips and is the shortest on the body, the tactile pads 73-1 to 73-4 can be used on any part of the body by setting the mutual distance between the electrodes to less than 2 mm. The distance between the electrodes and the body is the shortest on the body.

The tactile generating pads 73-1 through 73-4 are moved in the direction of the skin 101 by each of the air actuators 72-1 through 72-4, respectively, to contact a predetermined site on the skin 101. The air actuators 72-1 through 72-4 are moved in the direction of the skin 101 by the air actuators 72-1 through 72-4, respectively. The air actuators 72-1 through 72-4 are pneumatic actuators comprising a cylinder and a piston, respectively. When compressed air of a predetermined pressure is supplied to the air actuators 72-1 through 72-4, the piston protrudes from the cylinder to displace one of the tactile sensation generating pads 73-1 through 73-4 fixed to the piston, respectively. -4, which are fixed to the piston, are displaced, thereby moving them in the direction of the skin 101. For example, at a predetermined time, air actuator 72-2 is supplied with compressed air at a predetermined pressure to displace tactile sensation generating pad 73-2, thereby moving it in the direction of skin 101, and air actuators 72 1, air actuator 72-3 and air actuator 72-4 are not supplied with compressed air at a predetermined pressure, so that tactile sensation generating pad 73-1, tactile sensation generating pad 73-3 and tactile sensation 73-4 are not moved in the direction of the skin 101. At this time, the tactile generating pad 73-2 generates stimuli and transmits the stimuli to the skin 101.

At a predetermined time, all of the tactile generating pads 73-1 through 73-4 or any one or more of the tactile generating pads 73-1 through 73-4 are moved by the air actuators 72 All or any one or more of the tactile pads 73-1 through 73-4, or any one or more of the tactile pads 73-1 through 73-4, are moved by each of the air actuators 72-1 through 72-4 in the direction of the skin 101 to contact a predetermined area of the skin 101, or any of the tactile pads 73-1 through 73-4 are moved away from the skin 101, moved away from the skin 101.

When there is no need to distinguish between tactile sensation generating units 71-1 through 71-4 individually, they are hereinafter simply referred to as tactile sensation generating units 71. When there is no need to distinguish between air actuators 72-1 through 72-4 individually, they will hereinafter be referred to simply as air actuators 72.

Figure 3:
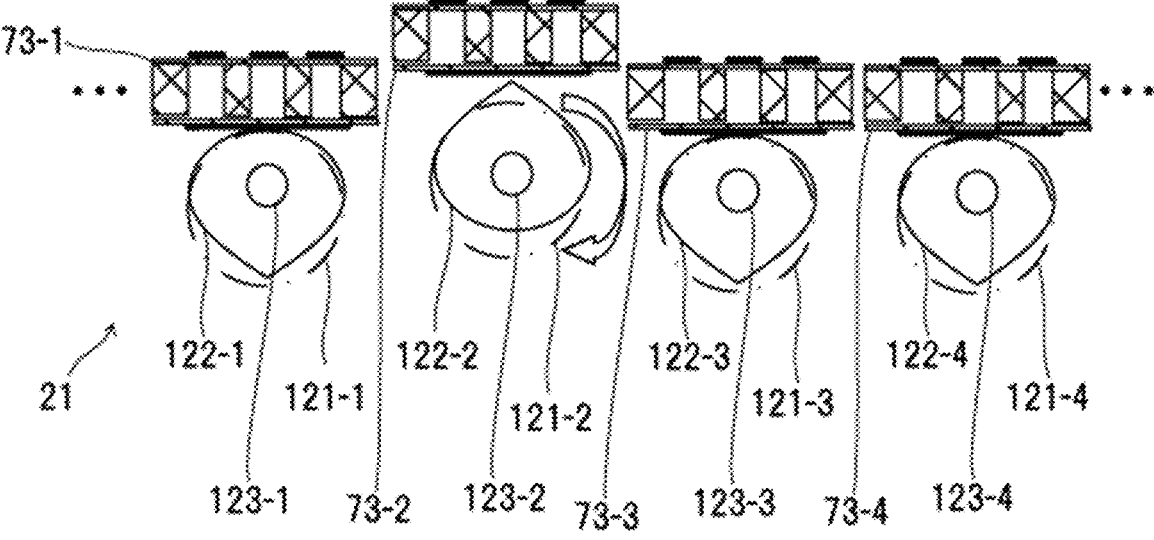
FIG. 3 shows another example of the configuration of the tactile sensation generating pad group 21.

FIG. 3 shows another example of the configuration of the tactile sensation generating pad group 21 when four tactile sensation generating pads 73-1 through 73-4 are included. The tactile sensation generating units 121-1 through 121-4 each include a tactile sensation generating pad 73-1 through 73-4 each, a cam 122-1 through 122 each of cams 122-1 through 122-4, and motors 123-1 through 123-4, respectively. The tactile generating units 121-1 through 121-4 each operate individually and independently to generate stimuli and transmit the generated stimuli to the skin 101.

The tactile generating pads 73-1 through 73-4 in FIG. 3 are moved in the direction of the skin 101 to contact a predetermined area of the skin 101 by each of the cams 122-1 through 122-4 and the motors 123-1 through 123 4 are moved in the direction of the skin 101 by each of the cams 122-1 through 122-4 and the motors 123-1 through 123-4, respectively, so as to contact a predetermined area of the skin 101. For example, the cams 122-1 through 122-4 are each a rotating plate cam. For example, the cams 122-1 through 122-4 each comprise a disc that is eccentric. For example, the motors 123-1 through 123-4 are each an electric motor. That is, the cams 122-1 through 122-4 are rotated by each of the motors 123-1 through 123-4 to rotate the tactile generating pads 73-1 or 73-4, respectively, and push each of the tactile sensation generating pads 73-1 through 73-4 toward the skin 101 when they reach a predetermined angular position with respect to each of the tactile sensation generating pads 73-1 through 73-4, respectively.

For example, at a given time, cam 122-2 is rotated by motor 123-2 so that the side protruding from the axis of rotation of cam 122-2 moves toward the tactile sensation generating pad 73-2 The cam 122-1, cam 122-3, and cam 122-4 are rotated by motor 123-1, motor 123-3, and motor 123-4 to move in the direction of skin 101 by pushing and displacing the tactile sensation-generating pad 73-2, and the cam 122-1, cam 122-3, and cam 122-4 are rotated by motor 123-1. -1, motor 123-3 and motor 123-4 do not rotate, respectively, so that tactile generating pad 73-1, tactile generating pad 73-3 and tactile generating pad 7 3-4 are not moved in the direction of skin 101. At this time, tactile generating pad 73-2 generates stimuli and transmits the stimuli to skin 101.

At a predetermined time, all of the tactile generating pads 73-1 to 73-4 or any one or more of the tactile generating pads 73-1 to 73-4 are moved by each of the cams 122 Each of cams 122-1 to 122-4 is moved by each of cams 122-1 to 122-4 in the direction of skin 101 so as to contact a predetermined area of skin 101, or any of tactile generating pads 73-1 to 73-4 are moved away from skin 101, moved away from the skin 101.

For example, the tactile sensation-generating pads 73-1 through 73-4 are attached to the skin 101 away from the skin 101 by a spring or other means not shown in the figure.

Each of the cams 122-1 through 122-4 was described as a plate cam, but may be a groove cam or a three-dimensional cam. Each of the motors 123-1 through 123-4 was described as an electric motor, but may be, but is not limited to, a pressure motor, molecular motor, or ultrasonic motor that uses fluid pressure.

Hereafter, when there is no need to distinguish between tactile sensation generating units 121-1 through 121-4 individually, they will simply be referred to as tactile sensation generating units 121. When there is no need to distinguish between cams 122-1 through 122-4 individually, they will hereinafter be referred to simply as cams 122. When there is no need to distinguish between motors 123-1 through 123-4 individually, they will simply be referred to as motor 123.

Figure 4:
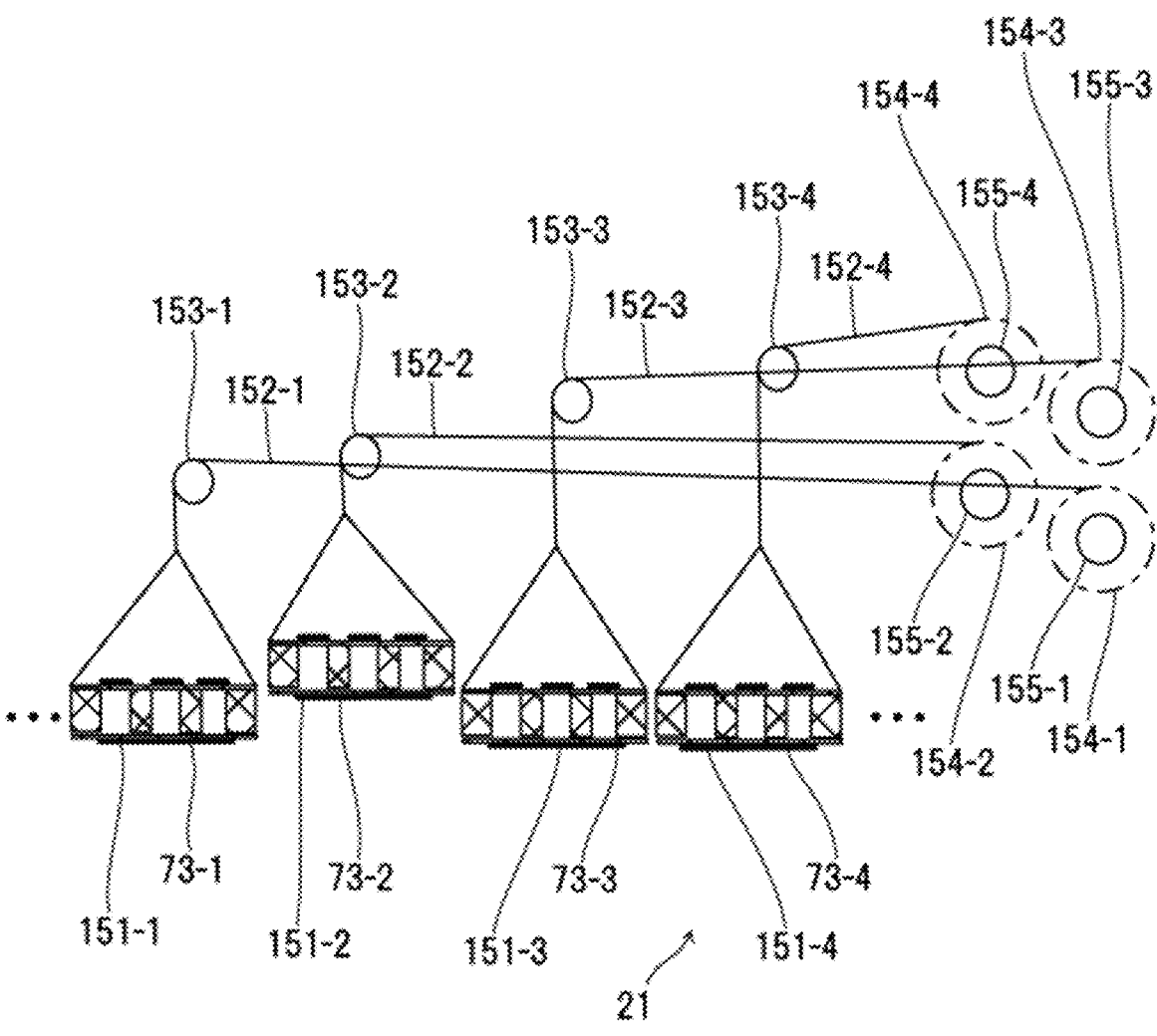
FIG. 4 shows another example of the configuration of the tactile sensation generating pads 21 is shown.

FIG. 4 shows yet another example of the configuration of the tactile sensation generating pad group 21 when four tactile sensation generating pads 73-1 through 73-4 are included. The tactile sensation generating units 151-1 through 151-4 are composed of tactile sensation generating pads 73-1 through 73-4, wires 152-1 through 152-each of pulleys 153-1 through 153-4, pulleys 154-1 through 154-4, and motors 155 155-1 through 155-4, and motors 155-1 through 155-4, respectively. Each of the tactile sensation generating units 151-1 through 151-4 operates individually and independently to generate stimuli and transmit the generated stimuli to the skin 101.

The tactile sensation generating pads 73-1 through 73-4 in FIG. 4 are each of wires 152-1 through 152-4, pulleys 153-1 through 153-4, and motors 155-1 through 155-4, respectively. 153-1 through 153-4, pulleys 154-1 through 154-4, and motors 155-1 through 155-4, respectively, to contact a predetermined area of skin 101. The wires 152-1 through 153-4 are moved in the direction of the skin 101 so as to make contact with a predetermined part of the skin 101. One end of each of the wires 152-1 through 152-4 is fixed to each of the tactile generating pads 73-1 through 73-4, and the other end of each of the wires 152-1 through 152-4 is fixed to each of the pads 73-1 through 73-4. The other end of each of the wires 152-1 through 152-4 is wound around each of the pulleys 154-1 through 154-4. Pulleys 153-1 through 153-4 are each rotatably supported on a shaft. The wires 152-1 through 152-4 are hung on each of the pulleys 153-1 through 153-4, and the direction of extension of the wires 152-1 through 152-4 is changed. The direction of extension of the wires 152-1 through 152-4 is changed. Pulleys 154-1 through 154-4 are rotated by motors 155-1 through 155-4, respectively. Motors 155-1 through 155-4 are electric motors. When each of pulleys 154-1 through 154-4 is rotated by each of motors 155-1 through 155-4, a wire wound on each of pulleys 154-1 through 154-4 is connected to the wire. When each of pulleys 154-1 through 154-4 is rotated by each of pulleys 155-1 through 155-4, the length of the wires 152-1 through 152-4 wound around each of pulleys 154-1 through 154-4 is changed, and the length of the wires 152-1 through 152-4 is changed. Each of the tactile sensation generating pads 73-1 through 73-4, which are fixed to one end of each of the wires 152-1 through 152-4, will be pulled and displaced.

That is, pulleys 154-1 through 154-4 are rotated by motors 155-1 through 155-4, respectively, to rotate each of wires 152-1 through 152-4, respectively, and each of the wires 152-1 through 152-4 pulls and presses each of the tactile generating pads 73-1 through 73-4 against the skin 101 against the skin 101.

For example, at a given time, pulley 154-2 is rotated by motor 155-2 to wind wire 152-2, which causes wire 152-2 to pull and displace tactile generating pad 73-2 and displaces it in the direction of skin 101, and pulley 154-1, pulley 154-3 and pulley 154-4 are rotated by motor 155-1 motor 155-3 and motor 155-4, respectively, do not rotate, so the tactile generating pad 73-1, tactile generating pad 73-3, and tactile generating pad 73 4 are not moved in the direction of skin 101. At this time, tactile generating pad 73-2 generates stimuli and transmits the stimuli to skin 101.

At a given time, all of the tactile pads 73-1 through 73-4, or any one or more of the tactile pads 73-1 through 73-4, are connected to the wire 152-1 through 152-4 via each of pulleys 153-1 through 153-4 and pulleys 154-1 through 154-4. 152-1 through 152-4 via each of pulleys 153-1 through 153-4 and pulleys 154-1 through 154-4, respectively. Each of them is pulled by each of them to move in the direction of the skin 101 so as to contact a predetermined area of the skin 101, or any of the tactile generating pads 73-1 through 73-4 are moved away from the skin 101.

For example, the tactile sensation-generating pads 73-1 through 73-4 are attached to the skin 101 away from the skin 101 by a spring or other means not shown in the figure.

For example, a group of tactile generating pads 21 including tactile generating units 151-1 through 151-4 can be realized as a glove-type device.

Motors 155-1 through 155-4 are described as electric motors, respectively, but may also be pressure motors, molecular motors, or ultrasonic motors that use fluid pressure.

Hereafter, when there is no need to distinguish between tactile sensation generating units 151-1 through 151-4 individually, they will simply be referred to as tactile sensation generating units 151. When there is no need to distinguish between wires 152-1 through 152-4 individually, they are hereinafter simply referred to as wires 152. When there is no need to distinguish between pulleys 153-1 through 153-4 individually, they are simply referred to as pulleys 153. When it is not necessary to distinguish between pulleys 154-1 through 154-4 individually, they are simply referred to as pulleys 154. When it is not necessary to distinguish between motors 155-1 through 155-4 individually, they are simply referred to as motor 155.

Figure 5:
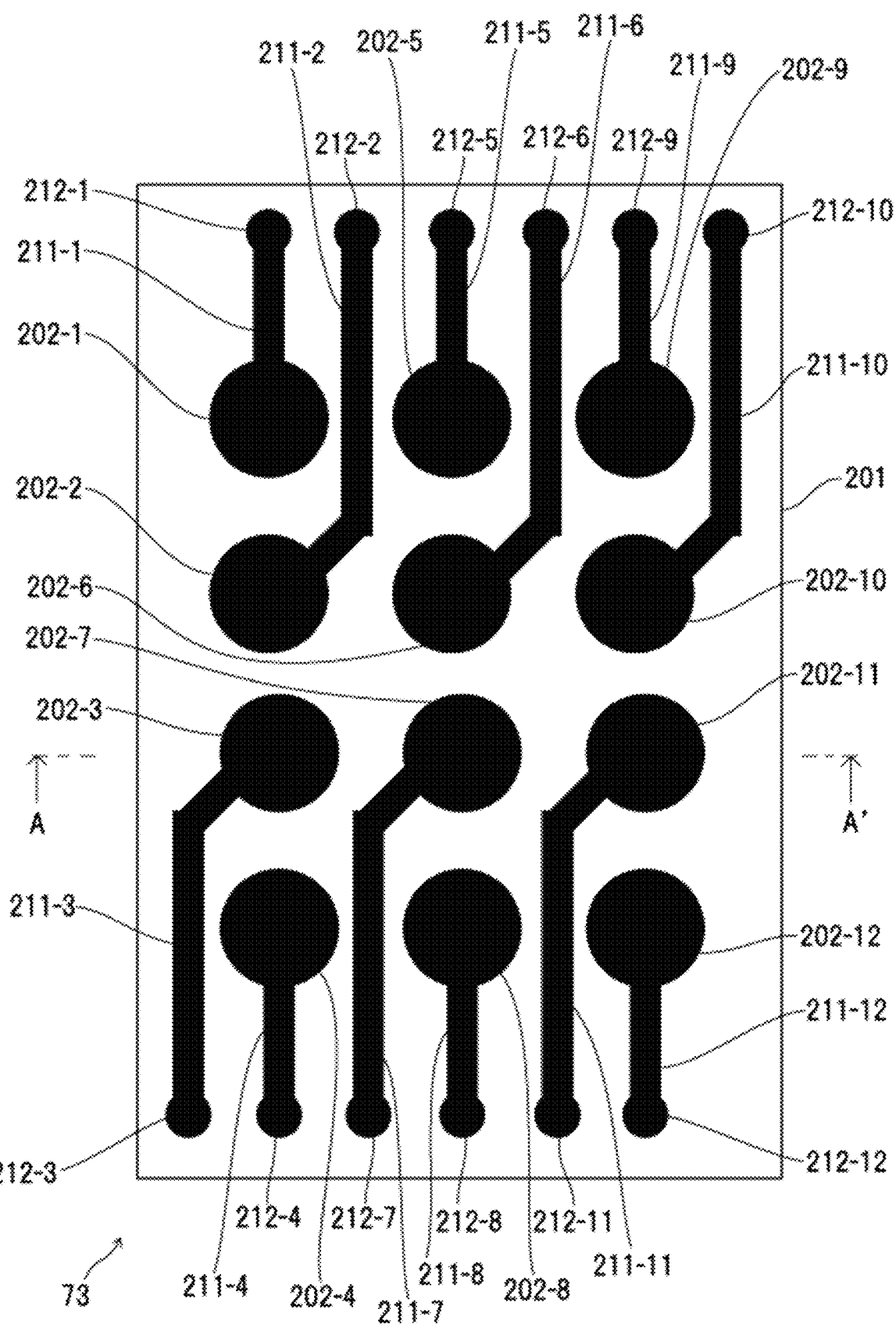
FIG. 5 shows a plan view showing an example of the configuration of the tactile sensation generating pad 73.
Figure 6:
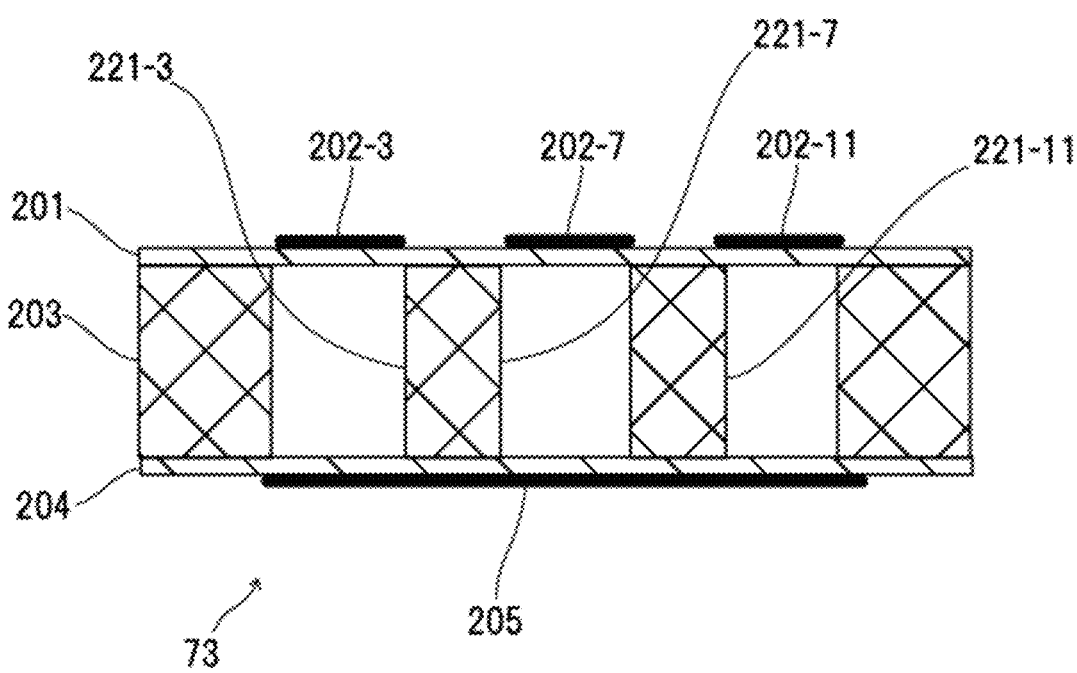
FIG. 6 shows a cross-sectional view showing a cross-section of the tactile sensation generating pad 73 at the line AA' in FIG. 5.

Next, an example of the details of the configuration of the tactile sensation generating pad 73 will be described. FIG. 5 is a plan view showing an example of the configuration of the tactile sensation generating pad 73. FIG. 6 is a cross-sectional view showing a cross-section of the tactile sensation generating pad 73 at the AA' line in FIG. 5. The tactile sensation generating pad 73 is composed of a film 201, electrodes 202-1 through 202-12, dielectric member 203, film 204, and electrode 205. The thickness of the tactile sensation generating pad 73 is between 0.2 mm and 0.5 mm.

Electrodes 202-1 through 202-12 are provided on one side of film 201. Electrodes 205 are provided on one side of film 204. Of the faces of the dielectric material 203, the upper face in FIG. 6 (hereinafter referred to simply as the upper face) The other side of the film 201 is attached to the first side, which is the On the second side of the face of the dielectric material 203 that is opposite to the first side (the lower side in FIG. 6 (hereinafter referred to simply as the lower side)), the other side of the film 204 is attached. The other side of the film 204 is affixed to the first side. In other words, the film 201 and the film 204 are affixed together with the dielectric material 203 in between. For example, the shape of the plane of the film 201, the shape of the plane of the dielectric member 203, and the shape of the plane of the film 204 are the same. For example, the shape of the plane of the film 201, the shape of the plane of the dielectric member 203, and the shape of the plane of the film 204 are rectangular. For example, the film 201, the dielectric member 203, and the film 204 are laminated so that they overlap each other in the planar direction. Electrodes 202-1 through 202-12 are provided on the outer surface of film 201, which is laminated with dielectric member 203 sandwiched between film 204. The electrodes 205 are provided on the outer side of the film 204, which is pasted together with the dielectric member 203 sandwiched between the film 201 and the film 204.

Film 201 is an example of a first film, which is a film formed into a film shape by polymeric material. The film 201 bends when voltage is applied. Film 204 is an example of a second film and is a film formed into a film shape using a polymeric material. Film 204 bends when voltage is applied.

Film 201 and film 204 are piezoelectric films such as PVDF (PolyVinylidene DiFluoride) or FEP (Fluorinated Ethylene Propylene), PTFE (Poly Tetra Fluoro Ethylene), PFA (Per Fluoro Alcoholic Acid), PFA (Per Fluoro Alcoholic Acid), and PTFE (Poly Tetra Fluoro Ethylene), respectively. PFA (Per Fluoro Alkoxy polymer), ETFE (Ethylene Tetra Fluoro Ethylene copolymer), PVDF, PCTFE (Poly Chloro Tri Fluoro Ethylene) or ECTFE (Ethylene Chloro Tri Fluoro Ethylene) Chloro Tri Fluoro Ethylene copolymer) or ECTFE (Ethylene Chloro Tri Fluoro Ethylene copolymer). The material of film 204 may be the same as or different from that of film 201.

Dielectric member 203 is a dielectric and insulator that is molded into a thin sheet of flexible material. For example, dielectric member 203 is molded from rubber such as silicone rubber, PDMS (dimethylpolysiloxane), fluoro rubber, acrylic rubber, or urethane rubber. The dielectric member 203 has holes 221-1 (not shown) and 221-2 (not shown), holes 221-3, holes 221-4 (not shown) through 221-6 (not shown) (not shown), holes 221-7, holes 221-8 (not shown) through 221-10 (not shown), holes 221-11 and holes 221-12 (not shown). Holes 221-1 through 221-12 penetrate from the film 201 side to the film 204 side of the face of the dielectric member 203. In other words, the holes 221-1 through 221-12 penetrate from the top surface to the bottom surface of the dielectric member 203. The top surface of the dielectric member 203 is an example of the first surface. The bottom surface of the dielectric member 203 is an example of the second surface.

Electrodes 202-1 through 202-12 are conductors and are formed in the form of a film. For example, electrodes 202-1 through 202-12 are a film or carbon nanotube (CNT) electrode film made of a metallic material such as gold (Au), platinum (Pt), titanium (Ti) or aluminum (Al). Electrodes 202-1 through 202-12 are formed flexibly. The electrodes 202-1 through 202-12 are insulated from each other. For example, the electrodes 202-1 through 202-12 are each formed as a circular thin film on one side of the film 201. For example, the electrodes 202-1 through 202-12 are each formed in a circular shape with a diameter of 1 mm.

Electrodes 202-1 through 202-12 are tactile generating points that produce stimuli that cause tactile and pressure sensations, respectively. The spacing between electrodes 202-1 through 202-12 is less than the two-point discrimination threshold of human skin. For example, when the tactile generating pad 73 is used on a fingertip, the distance between electrodes 202-1 through 202-12 is less than 2 mm. In this case, the distance between the electrodes 202-1 through 202-12 is the center-to-center distance of each of the circularly formed electrodes 202-1 through 202-12 or the distance between the circularly formed electrodes The distance from the outer edge to the outer edge of each of 202-1 through 202-12.

Terminals 212-1 through 212-12 are terminals for applying a voltage to each of electrodes 202-1 through 202-12 through each of wiring sections 211-1 through 211-12, respectively. The terminals 212-1 through 212-12 are terminals for applying voltage to each of the electrodes 202-1 through 202-12 through the wiring sections 211-1 through 211-12, respectively. Terminals 212-1 through 212-12 and wiring sections 211-1 through 211-12 are molded from the same material as electrodes 202-1 through 202-12. The terminals 212-1 through 212-12 and wiring sections 211-1 through 211-12 are molded from the same material as electrodes 202-1 through 202-12.

Terminals 212-1 through 212-12 are each formed in the form of a circular thin film. The wiring sections 211-1 through 211-12 each comprise a plurality of flat thin films connecting each of the terminals 212-1 through 212-12 to each of the electrodes 202-1 through 202-12, respectively, or comprise a plurality of flat thin films connected to each other.

For example, along one side of the film 201, whose top surface is rectangular in shape, terminals 212-1, 212-2, 212-5, 212-6, 212-9, and terminal 212-10 are located along one side of the film 201, which is rectangular in shape. Terminals 212-1, 212-2, 212-5, 212-6, 212-9, and 212-10 are located Along one opposite side of the film 201, terminals 212-3, 212-4, 212-7, 212-8, 212-11, and 212-12 are arranged. For example, terminals 212-1 through 212-12 are wire-bonded and electrically connected to the outside, respectively.

That is, when voltage is applied to terminal 212-1, voltage is applied to electrode 202-1. When voltage is applied to terminal 212-2, voltage is applied to electrode 202-2. Similarly, when a voltage is applied to each of terminals 212-3 through 212-12, a voltage is applied to each of electrodes 202-3 through 202-12.

The electrode 205 is a conductor and is formed in the form of a film. For example, electrode 205 is a film or carbon nanotube (CNT) electrode film made of a metallic material such as gold (Au), platinum (Pt), titanium (Ti) or aluminum (Al). Electrode 205 is formed flexibly. The electrode 205 is formed as a rectangular thin film on one side of the film 204. The electrode 205 is formed so as to face all of the electrodes 202-1 through 202-12. In other words, electrode 205 is formed so as to sandwich all of electrodes 202-1 through 202-12, film 201, dielectric member 203, and film 204. In other words, the electrode 205 is formed to overlap with all of the electrodes 202-1 through 202-12 in the thickness direction of the film 201, the dielectric member 203, and the film 204.

The holes 221-3 are formed in a columnar shape with a circular cross section so that they are circular on the top and bottom surfaces of the dielectric member 203. The edge of hole 221-3 on the top surface of dielectric member 203 coincides with the periphery of electrode 202-3. Electrode 205 covers the edge of hole 221-3 at the bottom surface of dielectric member 203 on one side of film 204.

The holes 221-7 are formed in a columnar shape with a circular cross section so that they are circular on the top and bottom surfaces of the dielectric member 203. The edge of hole 221-7 on the top surface of dielectric member 203 coincides with the periphery of electrode 202-7. Electrode 205 covers the edge of hole 221-7 at the bottom surface of dielectric member 203 on one side of film 204.

Furthermore, the holes 221-11 are formed in a columnar shape with a circular cross section so that they are circular on the top and bottom surfaces of the dielectric member 203. The edge of hole 221-11 at the top surface of dielectric member 203 coincides with the periphery of electrode 202-11. Electrode 205 covers the edge at the bottom surface of dielectric member 203 of hole 221-11 on one side of film 204.

Similarly, holes 221-1 and 221-2, holes 221-4 through 221-6, holes 221-8 through 221-10, and holes 221 12 are formed in the form of columns with circular cross-sections so that they are circular on the top and bottom surfaces of the dielectric material 203. The holes 221-1 and 221-2, holes 221-4 through 221-6, holes 221-8 through 221-10, and holes 221 The edges on the top surface of the dielectric material 203 of -12 are formed by electrodes 202-1 and 202-2, electrodes 202-4 through 202-6, electrodes 202 The edges on the top surface of dielectric member 203 of electrodes 202-1 and 202-2, electrodes 202-4 through 202-6, electrodes 202-8 through 202-10, and electrode 202-12 coincide with the perimeter of each of them. Electrode 205 is aligned on one side of film 204 with the perimeter of holes 221-1 and 221-2, holes 221-4 through 221-6, holes 221-8 through 221-10, and holes 221-12, respectively, on the bottom surface of the dielectric member 203.

Thus, any of the electrodes 202-1 through 202-12 and the electrode 205 are placed between the film 201 and the film 204, and the portion of the dielectric member 203 in which the holes 221-1 and 221-12 are arranged so as to sandwich the portion in which any of the holes 221-1 and 221-12 are formed.

The cross-sectional shape of the holes 221-1 through 221-12 formed in the dielectric member 203 on the top surface of the dielectric member 203 is the same as that of the respective faces of the membrane electrodes 202-1 through 202-12. The shape is the same as the shape of the surface of each of the membrane electrodes 202-1 through 202-12.

Each of the electrodes 202-1 through 202-12 is a cross-section of each of the holes 221-1 through 221-12 formed in the dielectric member 203 across the film 201 and located on the cross-section at the top surface of the member 203.

Before use, a voltage of from 100 V to 15 KV is applied to the tactile sensation generating pad 73 to precharge the charge. When the voltage is applied as a precharge between electrodes 202-1 through 202-12 and electrode 205, an electric charge accumulates between film 201 and film 204, especially in holes 221-1 through 221 The charge is accumulated in the holes 221-1 through 221-12 of the dielectric member 203. Precharging the charge causes the tactile generating pad 73 to flex to a greater degree with less voltage.

When an AC voltage of 30 Hz to 500 Hz of sine, triangular or square waves is applied between all or any of the electrodes 202-1 to 202-12 and the electrode 205, the tactile sensation generating pad 73 can generate individual 1.5 mm to 3 mm sized The vibrations can be generated individually in areas to induce tactile sensations on the skin 101. The tactile sensation generating pad 73 generates vibrations according to waveforms such as sine, triangular or square waves.

The tactile sensation-generating pad 73 is made primarily of resin or silicone rubber, which can be easily deformed and fitted to the skin 101 to present tactile sensations.

When the ratio of the area of holes 221-1 through 221-12 to the total area of dielectric material 203 is between 10% and 40%, tactile generating pad 73 will flex to a greater extent at a smaller voltage.

Although holes 221-1 through 221-12 were described as penetrating from the top surface to the bottom surface of dielectric member 203, they can be shaped to be recessed from the top or bottom surface of dielectric member 203 without penetrating from the top surface to the bottom surface of dielectric member 203, and furthermore, they 3, it can also be a bubble-shaped hole in the interior of the dielectric member 203.

The electrodes 202-1 through 202-12 are described as circular thin films on one side of the film 201, respectively, but they can also be polygonal shapes such as oval, ellipsoidal, or triangular or square.

As described above, all or any of the electrodes 202-1 through 202-12 can be vibrated more strongly.

Hereafter, electrodes 202-1 through 202-12 will simply be referred to as electrodes 202 when there is no need to distinguish between them individually. Hereafter, holes 221-1 through 221-12 will simply be referred to as holes 221 when there is no need to distinguish between them individually.

Skin 101 has a number of receptors for sensing vibration, shape, and shear forces. When the tactile generating pad 73 contacts the skin 101 and transmits vibrations, the receptors in the skin 101 are activated to generate tactile and pressure sensations. In other words, the tactile generating pad 73 uses sound pressure waves and pressure to generate tactile and pressure sensations by activating receptors in human skin 101 using vibration and pressure stimulation.

As described with reference to FIGS. 2 and 4, when the tactile generating pad 73 is pressed against the skin 101 by the air actuator 72, cam 122 and motor 123, or wire 152, pulley 153, pulley 154 and motor 155, electrodes 202-1 through 20 2-12, all or any part of the electrodes can be vibrated to activate receptors in the skin 101 to generate tactile and pressure sensations. For example, when all or any of the electrodes 202-1 through 202-12 are vibrated with the tactile sensation generating pad 73 pressed against the skin 101 with relatively weak force, the receptors of the skin 101 near the surface of the skin 101, such as the Merkel plates and Meissner bodies are activated to generate tactile sensations. For example, when the tactile sensation-generating pad 73 is pressed against the skin 101 with greater force, vibrating all or any part of the electrodes 202-1 through 202-12 activates receptors in the skin 101 that are deep within the dermis of the skin 101, such as Pachini bodies and receptors for pressure in the joints are activated to generate pressure sensation.

Figure 7:
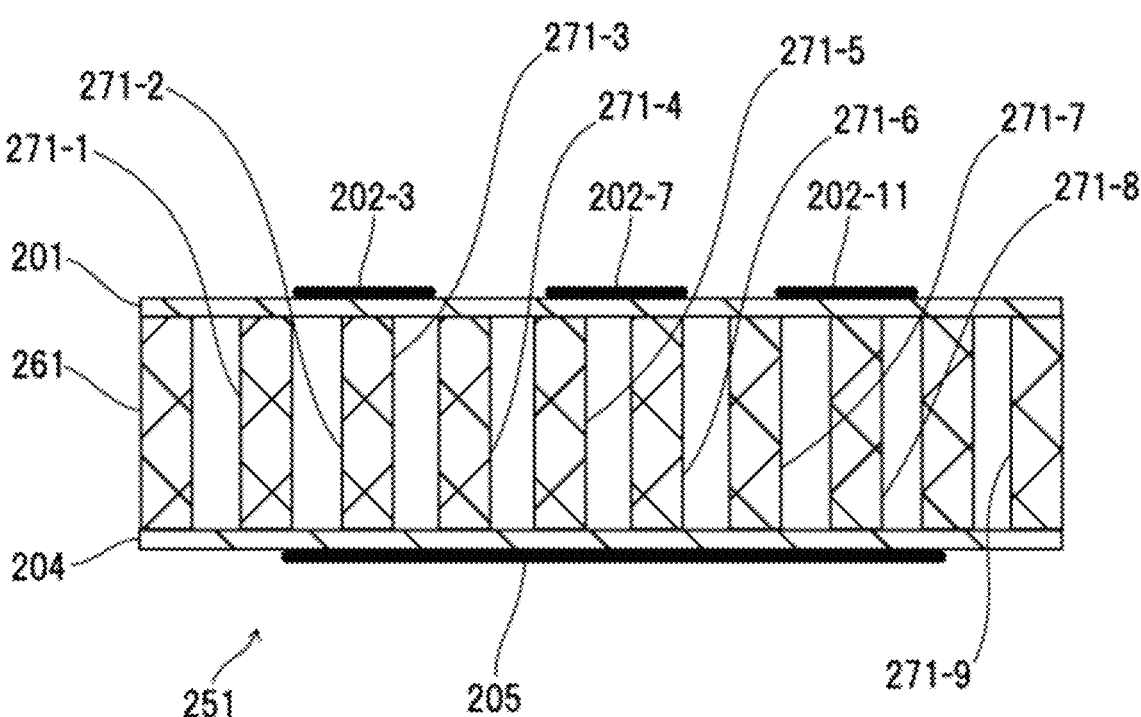
FIG. 7 shows a cross-sectional view showing a cross-section of the tactile sensation generating pad 251.

Next, an example of the details of the configuration of the tactile sensation generating pad 251, which constitutes the tactile sensation generating pad group 21, will be described. Tactile sensation generating pad 251 is used in tactile sensation generating pad group 21 in the same way as tactile sensation generating pad 73. FIG. 7 shows a cross-sectional view of the tactile sensation generating pad 251. In FIG. 7, parts similar to those shown in FIG. 6 are marked with the same symbols, and their descriptions are omitted.

The tactile sensation generating pad 251 is composed of a film 201, electrodes 202-1 through 202-12, film 204, electrode 205, and dielectric material 261. The thickness of the tactile sensation generating pad 251 is between 0.2 mm and 0.5 mm.

Of the faces of the dielectric material 261, the upper face in FIG. 7 (hereinafter referred to simply as the upper face) The other side of the film 201 is attached to the first side, which is the On the second side of the face of the dielectric material 261 that is opposite to the first side (the lower side in FIG. 7 (hereinafter referred to simply as the lower side)) The other side of the film 201 is attached to the other side of the film 204. In other words, the film 201 and the film 204 are affixed together with the dielectric material 261 between them. For example, the shape of the plane of the film 201, the shape of the plane of the dielectric member 261, and the shape of the plane of the film 204 are the same. For example, the shape of the plane of the film 201, the shape of the plane of the dielectric member 261, and the shape of the plane of the film 204 are rectangular. For example, the film 201, the dielectric member 261, and the film 204 are laminated so that they overlap each other in the planar direction.

Dielectric member 261 is a dielectric and insulator that is molded into a thin sheet of flexible material. For example, the dielectric member 261 is molded from rubber such as silicone rubber, PDMS, fluoro rubber, acrylic rubber, or urethane rubber. Holes 271-1 through 271-9 are formed in the dielectric member 261. The holes 271-1 through 271-9 penetrate from the top surface to the bottom surface of the dielectric member 261. Although the cross sections at electrodes 202-3, 202-7, and 202-11 are shown in FIG. 7, the cross sections at electrodes 202-1, 202-5, and 2 The cross sections at electrode 202-3, electrode 202-7, and electrode 202-11 are shown in FIG. 7. The same holes as holes 271-1 through 271-9 are also formed in the portion of dielectric member 261 between each of electrodes 202-12 and electrode 205.

Electrode 205 is formed to overlap with all of electrodes 202-1 through 202-12 in the thickness direction of film 201, dielectric member 261, and film 204.

Holes 271-1 through 271-9 are formed in the form of columns with circular cross-sections so that they are circular on the top and bottom surfaces of dielectric member 261, respectively. The diameter of the bottom surface of each of holes 271-1 through 271-9 is smaller than the diameter of each of electrodes 202-3, 202-7, and 202-11. Electrode 202-3 is positioned on one side of film 201 to cover holes 271-2 and 271-3. Electrode 202-7 is arranged to cover hole 271-5 on one side of film 201. Electrode 202-11 is arranged to cover holes 271-7 and 271-8 on one side of film 201. That is, each of electrode 202-3, electrode 202-7, and electrode 202-11 is arranged on one side of film 201 to cover holes 271-1 through 271-9 of which one or two are arranged to cover one or two of the holes 271-1 through 271-9. Electrode 205 covers the edge of holes 271-1 through 271-9 at the bottom surface of dielectric member 261 on one side of film 204.

The holes 271-1, 271-4, 271-6, and 271-9 are formed in the portion of the dielectric member 261 that is outside of the portion of the dielectric member 261 that is sandwiched between the electrodes 202-1 through 202-12 and electrodes 205.

Thus, each of electrodes 202-3, 202-7, and 202-11 is arranged to cover one or two of holes 271-1 through 271-9. The electrodes 202-3, 202-7 and 202-11 are arranged to cover one or two of the holes 271-1 through 271-9. That is, electrode 202-3, electrode 202-7, and electrode 202-11 are arranged to cover one or two of holes 271-2, holes 271-3, holes 271-5, holes 271-9, and holes 271-9 formed in dielectric member 261 via film 201. The electrodes 202-3, 202-5, 202-7, and 202-11 are arranged on the cross section of the upper surface of the dielectric member 261 of holes 271-2, 271-3, 271-5, 271-7, and 271-8 formed in the dielectric member 261 through the film 201.

A voltage of 100 V or 15 KV is applied to the tactile sensation generating pad 251 to pre-charge it before use. When a voltage is applied as a precharge between electrodes 202-1 through 202-12 and electrode 205, the voltage is applied between film 201 and film 204, especially between holes 271-1 through 221 The charge is accumulated in holes 271-1 through 221-9 and holes 271-1 through 271-9 as well as holes 271-1 through 271-9. Precharging the charge causes the tactile generating pad 251 to flex to a greater degree at a smaller voltage.

When an alternating voltage of 30 Hz to 500 Hz of sine, triangular or square waves is applied between all or any of the electrodes 202-1 through 202-12 and electrode 205, the tactile sensation generating pad 251 can generate individual 1.5 mm to 3 mm sized The vibrations can be generated individually in areas to induce tactile sensations on the skin 101. The tactile sensation generating pad 251 generates vibrations according to waveforms such as sine, triangular or square waves.

The tactile sensation-generating pad 251 is made primarily of resin or silicone rubber, which can be easily deformed and fitted to the skin 101 to present tactile sensations.

When the ratio of the area of holes 271-1 through 221-9 and holes similar to holes 271-1 through 271-9 to the overall area of dielectric member 261 is between 10% and 40%, the tactile generating pad 251, become more flexed at smaller voltages.

Although holes 271-1 through 221-9 and holes similar to holes 271-1 through 271-9 are described as penetrating from the top surface to the bottom surface of dielectric member 261 The holes may be recessed from the top or bottom surface of the dielectric member 261 without penetrating through the dielectric member 261, and furthermore, the holes may be bubble-shaped holes inside the dielectric member 261.

Hereafter, holes 271-1 through 271-9 will be referred to simply as holes 271 when it is not necessary to distinguish them individually.

Figure 8:
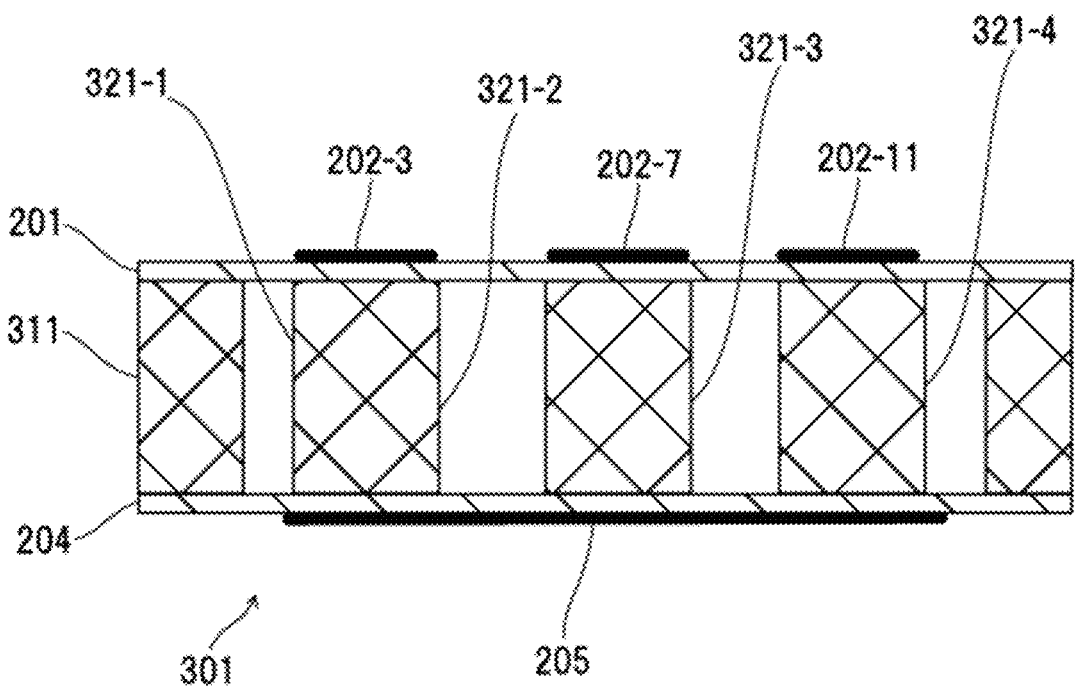
FIG. 8 shows a cross-sectional view showing a cross-section of tactile sensation generating pad 301.

Next, an example of the details of the configuration of the tactile sensation generating pad 301 that constitutes the tactile sensation generating pad group 21 will be described. Tactile sensation generating pad 301 is used in tactile sensation generating pad group 21 in the same way as tactile sensation generating pad 73. FIG. 8 is a cross-sectional view of the tactile sensation generating pad 301. In FIG. 8, parts similar to those shown in FIG. 6 are marked with the same symbols, and their descriptions are omitted.

The tactile sensation generating pad 301 is composed of a film 201, electrodes 202-1 through 202-12, film 204, electrode 205, and dielectric material 311. The thickness of the tactile sensation generating pad 301 is between 0.2 mm and 0.5 mm.

Of the faces of the dielectric material 311, the upper face in FIG. 8 (hereinafter referred to simply as the upper face) The other side of the film 201 is attached to the first side, which is the On the second side of the face of the dielectric material 311 that is opposite to the first side (the lower side in FIG. 8 (hereinafter referred to simply as the lower side)), the other side of the film 201 is attached. The other side of the film 201 is affixed to the other side of the film 204. In other words, the film 201 and the film 204 are affixed together with the dielectric material 311 between them. For example, the shape of the plane of the film 201, the shape of the plane of the dielectric member 311, and the shape of the plane of the film 204 are the same. For example, the shape of the plane of the film 201, the shape of the plane of the dielectric member 311, and the shape of the plane of the film 204 are rectangular. For example, the film 201, the dielectric member 311, and the film 204 are laminated so that they overlap each other in the planar direction.

Dielectric member 311 is a dielectric and insulator that is molded into a thin sheet of flexible material. For example, dielectric member 311 is molded from rubber such as silicone rubber, PDMS, fluoro rubber, acrylic rubber, or urethane rubber. Holes 321-1 through 321-4 are formed in the dielectric member 311. The holes 321-1 through 321-4 penetrate from the top surface to the bottom surface of the dielectric member 311. Although the cross sections at electrodes 202-3, 202-7, and 202-11 are shown in FIG. 8, the cross sections at electrodes 202-1, 202-5, and 2 The cross sections at electrode 202-3, electrode 202-7, and electrode 202-11 are shown in FIG. 8. The same holes as holes 321-1 through 321-4 are also formed in the portion of dielectric member 311 between each of electrodes 202-12 and electrode 205.

Electrode 205 is formed to overlap with all of electrodes 202-1 through 202-12 in the thickness direction of film 201, dielectric member 311, and film 204.

Holes 321-1 through 321-4 are formed in the form of columns with circular cross-sections so that they are circular on the top and bottom surfaces of dielectric member 311, respectively. Hole 321-1 is formed between the left end side of dielectric member 311 and the portion sandwiched by electrode 202-3 and electrode 205 in FIG. 8. Hole 321-2 is formed between the portion sandwiched by electrode 202-3 and electrode 205 and the portion sandwiched by electrode 202-7 and electrode 205. Hole 321-3 is formed between the portion sandwiched by electrode 202-7 and electrode 205 and the portion sandwiched by electrode 202-11 and electrode 205. Hole 321-4 is formed between the portion sandwiched by electrode 202-7 and electrode 205 and the right end side of dielectric member 311 in FIG. 8.

Thus, each of electrodes 202-3, 202-7, and 202-11 and electrode 205 are arranged to sandwich a portion of dielectric member 311 that is outside of the portion in which holes 321-1 through 321 The electrodes 202-3, 202-7, and 202-11 and the electrode 205 are arranged so as to sandwich the portion of the dielectric member 311 that is outside the portion where the holes 321-1 through 321-4 are formed. In other words, each of electrodes 202-3, 202-7, and 202-11 and electrode 205 are positioned between portions of dielectric member 311 in which holes 321-1 through 321-4 are not formed. In other words, each of the electrodes 202-3, 202-7, and 202-11 and the electrode 205 are arranged so as to sandwich the portion of the dielectric member 311 in which holes 321-1 through 321-4 are not formed.

Holes 321-1 through 321-4 are formed in the portion of dielectric member 311 that is outside the portion sandwiched between electrodes 202-1 through 202-12 and electrode 205.

Before use, a voltage of 100 V or 15 KV is applied to the tactile sensation generating pad 301 to pre-charge the charge. When a voltage is applied as a precharge between electrodes 202-1 through 202-12 and electrode 205, a charge is applied between film 201 and film 204, especially between holes 321-1 through 321-4 and holes 321-1 through 321-4 of dielectric member 311. Precharging the charge causes the tactile generating pad 301 to flex to a greater degree at a smaller voltage.

When an AC voltage of 30 Hz to 500 Hz of sine, triangular or square waves is applied between all or any of the electrodes 202-1 to 202-12 and the electrode 205, the tactile sensation generating pad 301 can generate individual 1.5 mm to 3 mm sized The vibrations can be generated individually in areas to induce tactile sensations on the skin 101. The tactile sensation generating pad 301 generates vibrations according to waveforms such as sine, triangular or square waves.

The tactile sensation-generating pad 301 can be easily deformed and fitted to the skin 101 to present tactile sensations because resin or silicone rubber is the main material.

When the ratio of the area of holes 321-1 through 321-4 and holes 321-1 through 321-4 and similar holes to the overall area of dielectric material 311 is between 10% and 40%, tactile generating pad 301, become more flexed at smaller voltages.

Although holes 321-1 through 321-4 and holes similar to holes 321-1 through 321-4 are described as penetrating from the top surface to the bottom surface of dielectric member 311 The holes may not penetrate through and may be recessed from the top or bottom surface of the dielectric member 311, and furthermore, they may be bubble-shaped holes inside the dielectric member 311.

Hereafter, holes 321-1 through 321-4 will be referred to simply as holes 321 when it is not necessary to distinguish them individually.

Figure 9:
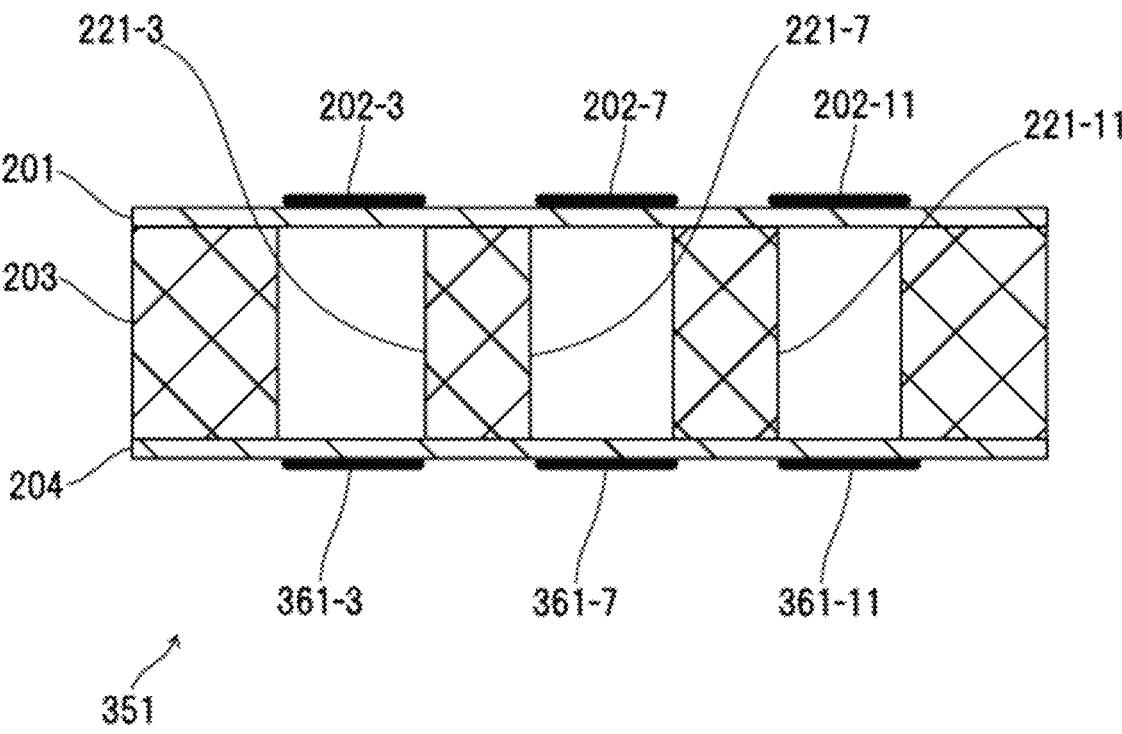
FIG. 9 shows a cross-sectional view showing a cross-section of tactile sensation generating pad 351.

Next, an example of the details of the configuration of the tactile sensation generating pad 351 that constitutes the tactile sensation generating pad group 21 will be described. Tactile sensation generating pad 351 is used in tactile sensation generating pad group 21 in the same way as tactile sensation generating pad 73. FIG. 9 is a cross-sectional view of the tactile sensation generating pad 351. In FIG. 9, parts similar to those shown in FIG. 6 are marked with the same symbols, and their descriptions are omitted.

The tactile sensation generating pad 351 is composed of a film 201, electrodes 202-1 through 202-12, dielectric member 203, film 204, and electrodes 361-1 through 361-12. The thickness of the tactile sensation generating pad 351 is between 0.2 mm and 0.5 mm.

In FIG. 9, the cross sections at electrodes 202-3, 202-7 and 202-11 and electrodes 361-3, 361-7 and 361-7 are shown. The cross sections at electrodes 202-3, 202-7 and 202-11, and electrodes 361-3, 361-7 and 361-7 are shown in FIG. 9, and holes 321-1 are formed in the portion of dielectric material 311 between electrodes 202-1 and electrode 361-1 (not shown). 321-2 is formed in the portion of dielectric member 311 between electrodes 202-2 and electrode 361-2 (not shown), and similarly, holes 321-2 are formed in the portion of dielectric member 311 between each of electrodes 202-4 through 202-6 and electrode 361-6 (not shown). Similarly, in the portion of dielectric member 311 between each of electrodes 202-4 through 202-6 and each of electrodes 361-4 (not shown) through 361-6 (not shown), holes 321-4 through 321-4 are formed.

Holes 321-4 through 321-4 are formed in the portion of dielectric member 311 between each of electrodes 202-8 through 202-10 and each of electrodes 361-8 (not shown) through 361-10 (not shown). 321-8 through 321-10, respectively, and holes 321-12 are formed in the portion of dielectric member 311 between each of electrodes 202-12 and electrodes 361-12 (not shown). formed.

Each of the electrodes 361-1 through 361-12 is a conductor and is formed in the form of a film. For example, each of electrodes 361-1 through 361-12 is a film or carbon nanotube (CNT) electrode film made of a metallic material such as gold (Au), platinum (Pt), titanium (Ti) or aluminum (Al). Electrodes 361-1 through 361-12 are formed flexibly. Electrodes 361-1 through 361-12 are insulated from each other. For example, electrodes 361-1 through 361-12 are each formed as a circular thin film on one side of the film 204. For example, electrodes 361-1 through 361-12 are each formed in a circular shape with a diameter of 1 mm. Each of the electrodes 361-1 through 361-12 has a wiring portion and a terminal, as do each of the electrodes 202-1 through 202-12.

Each of electrodes 361-1 through 361-12 is formed to face each of electrodes 202-1 through 202-12. Each of electrodes 361-1 through 361-12 is formed to sandwich each of electrodes 202-1 through 202-12 and film 201, dielectric member 203, and film 204. Electrode 361-1 is positioned opposite electrode 202-1 across film 201, dielectric member 203, and film 204. Electrode 361-2 is positioned opposite electrode 202-2 across film 201, dielectric member 203, and film 204. Similarly, each of electrodes 361-3 through 361-12 is positioned opposite each of electrodes 202-3 through 202-12 across film 201, dielectric member 203, and film 204. The electrodes 361-3 through 361-12 are formed in positions opposite each of the electrodes 202-3 through 202-12, with the film 201, dielectric member 203, and film 204 in between.

In other words, each of electrodes 361-1 through 361-12 is formed in the thickness direction of film 201, dielectric member 203, and film 204 at a In other words, each of the electrodes 361-1 through 361-12 is formed at a position opposite to each of the electrodes 202-1 through 202-12 in the thickness direction of the film 201, dielectric member 203 and film 204.

The edge of hole 221-3 at the bottom surface of dielectric member 203 coincides with the circumference of electrode 361-3. Electrode 361-3 covers the edge at the bottom surface of dielectric member 203 of hole 221-3 on one side of film 204. The edge of hole 221-7 at the bottom surface of dielectric member 203 coincides with the outer circumference of electrode 361-7. Electrode 361-7 covers the edge of hole 221-7 at the bottom surface of dielectric member 203 on one side of film 204. Further, the edge of hole 221-11 at the bottom surface of dielectric member 203 coincides with the circumference of electrode 361-11. Electrode 361-11 covers the edge at the bottom surface of dielectric member 203 of hole 221-11 on one side of film 204.

The edges of holes 221-1 and 221-2, holes 221-4 through 221-6, holes 221-8 through 221-10, and holes 221 The edges of the bottom surface of the dielectric material 203 of holes 221-1 and 221-2, holes 221-4 through 221-6, holes 221-8 through 221-10, and holes 221-12 are the same as those of electrodes 361-1 and 361-2, electrodes 361-4 through 361-6, electrodes 361-8 through 361-10, and electrodes 361-12. 361-8 through 361-10, and electrodes 361-12, respectively. Each of electrodes 361-1 and 361-2, electrodes 361-4 through 361-6, electrodes 361-8 through 361-10, and electrode 361 Each of electrodes 361-1 and 361-2, electrodes 361-4 through 361-6, electrodes 361-8 through 361-10, and electrodes 361-12 are aligned on one side of film 204 with holes 221-1 and 221-2, holes 221-4 through 221-6, holes 221 The holes 221-1 and 221-2, holes 221-4 through 221-6, holes 221-8 through 221-10, and holes 221-12 each cover the edge of the bottom surface of dielectric member 203 on one side of film 204.

Thus, each of the electrodes 202-1 through 202-12 and each of the electrodes 361-1 through 361-12 are sandwiched between the film 201 and the film 204 and the portion of the dielectric member 203 of which each of the holes 221-1 and 221-12 are positioned between the portions in which each of the holes 221-1 and 221-12 is formed.

Before use, a voltage of 100 V or 15 KV is applied to the tactile sensation generating pad 351 to pre-charge it with an electric charge. When the voltage is applied as a precharge between electrodes 202-1 through 202-12 and electrodes 361-1 through 361-12, a charge is accumulated between film 201 and film 204, especially in the dielectric material 203 In particular, an electric charge is accumulated in the holes 221-1 through 221-12 of the dielectric member 203. Precharging the charge causes the tactile generating pad 351 to flex to a greater degree at a smaller voltage.

The tactile sensation generating pad 351 can induce tactile sensation by applying a sine, triangular or square wave 30 Hz to 500 Hz AC voltage between electrodes 202-1 and 361-1 or between electrodes 202-12 and 361-12, all or any of them. to 500 Hz can be applied to individual areas of 1.5 to 3 mm in size to generate individual vibrations and induce tactile sensations in the skin 101. The tactile sensation generating pad 351 generates vibrations according to waveforms such as sine, triangular or square waves.

The tactile sensation-generating pad 351 can be easily deformed and fitted to the skin 101 to present tactile sensations because the main material is resin or silicone rubber.

When the ratio of the area of holes 221-1 through 221-12 to the total area of dielectric material 203 is between 10% and 40%, tactile generating pad 351 will flex to a greater degree at a smaller voltage.

Hereafter, electrodes 361-1 through 361-12 will be referred to simply as electrodes 361 when it is not necessary to distinguish them individually.

Figure 10:
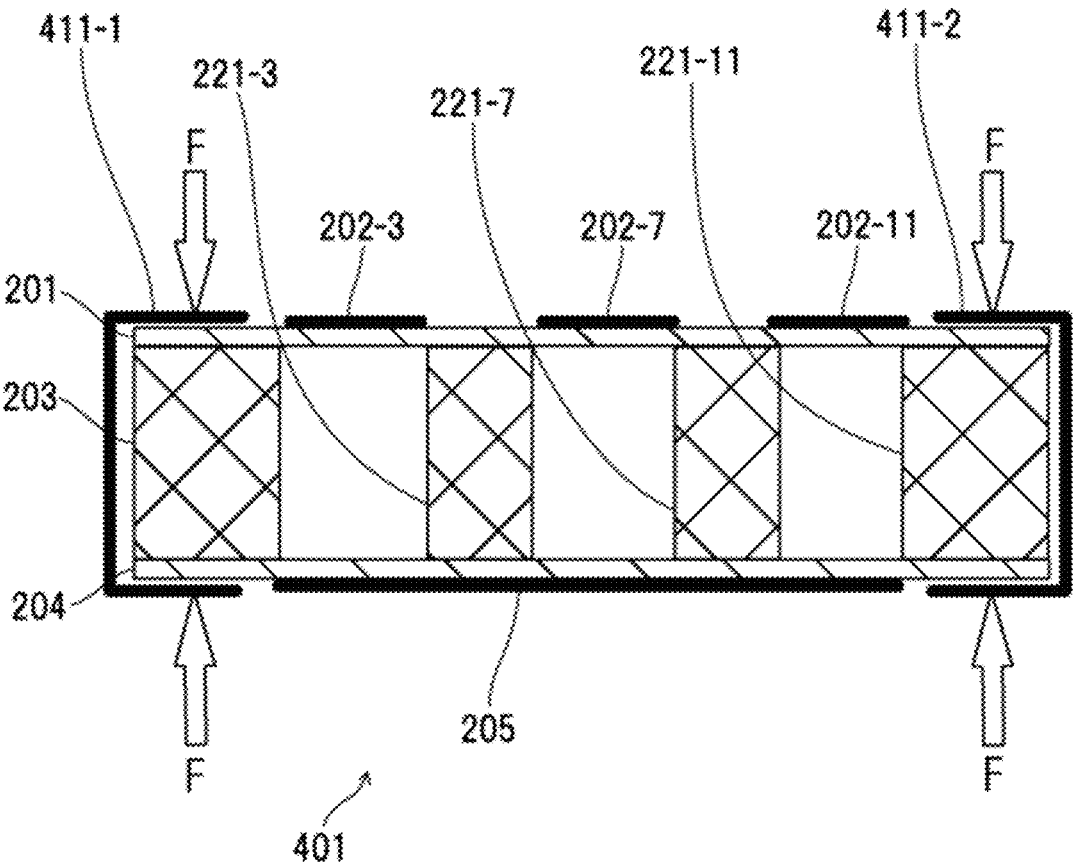
FIG. 10 shows a cross-sectional view showing a cross-section of tactile sensation generating pad 401.

Next, an example of the details of the configuration of the tactile sensation generating pad 401, which constitutes the tactile sensation generating pad group 21, will be described. Tactile sensation generating pad 401 is used in tactile sensation generating pad group 21 in the same way as tactile sensation generating pad 73. FIG. 10 shows a cross-sectional view of the tactile sensation generating pad 401. In FIG. 10, parts similar to those shown in FIG. 6 are marked with the same symbols, and their descriptions are omitted.

Tactile sensation generating pad 401 includes film 201, electrodes 202-1 through 202-12, dielectric member 203, film 204, electrode 205, and springs 411-1 and 411-2. It is composed of. The thickness of the tactile sensation generating pad 411 is between 0.2 mm and 0.5 mm. The springs 411-1 and 411-2 are formed of a spring material with a U-shaped cross section. Spring 411-1 pinches and presses the left side edge of film 201, dielectric member 203 and film 204 in FIG. 10 with a force of 10 mN or 0.5 N. Spring 411-2 pinches and presses the right end of film 201, dielectric member 203 and film 204 in the direction indicated by F in FIG. 10 with a force of 10 mN to 0.5 N. When springs 411-1 and 411-2 pinch the opposite ends of film 201, dielectric member 203, and film 204, preload can be applied uniformly to the entire film 201, dielectric member 203, and film 204.

Thus, springs 411-1 and 411-2 press between the edges of film 201, dielectric member 203, and film 204. In this way, a smaller voltage causes greater bending.

The springs 411-1 and 411-2 can be molded from metal material or resin. Although it was explained that the springs 411-1 and 411-2 sandwich the opposite edges of the film 201, dielectric member 203, and film 204, this is not limited to this, screws such as bolts and nuts, clips, and other pinching and pressing A configuration that can do so can be adopted.

Before use, a voltage of 100 V or 15 KV is applied to the tactile sensation generating pad 401 to pre-charge the charge. When a voltage is applied as a precharge between electrodes 202-1 through 202-12 and electrode 205, an electric charge accumulates between film 201 and film 204, especially in holes 221-1 through 221 The charge is accumulated in the holes 221-1 through 221-12 of the dielectric material 203. Precharging the charge causes the tactile generating pad 401 to flex to a greater degree with less voltage.

When an alternating voltage of 30 Hz to 500 Hz of sine, triangular or square waves is applied between all or any of the electrodes 202-1 through 202-12 and electrode 205, the tactile sensation generating pad 401 can generate individual 1.5 mm to 3 mm sized The vibrations can be generated individually in areas to induce tactile sensations on the skin 101. The tactile sensation generating pad 401 generates vibrations according to waveforms such as sine, triangular or square waves.

The tactile sensation-generating pad 401 can be easily deformed and fitted to the skin 101 to present tactile sensations because the main material is resin or silicone rubber.

When the ratio of the area of holes 221-1 through 221-12 to the total area of dielectric material 203 is between 10% and 40%, the tactile generating pad 401 will flex to a greater degree at a smaller voltage.

Figure 11:
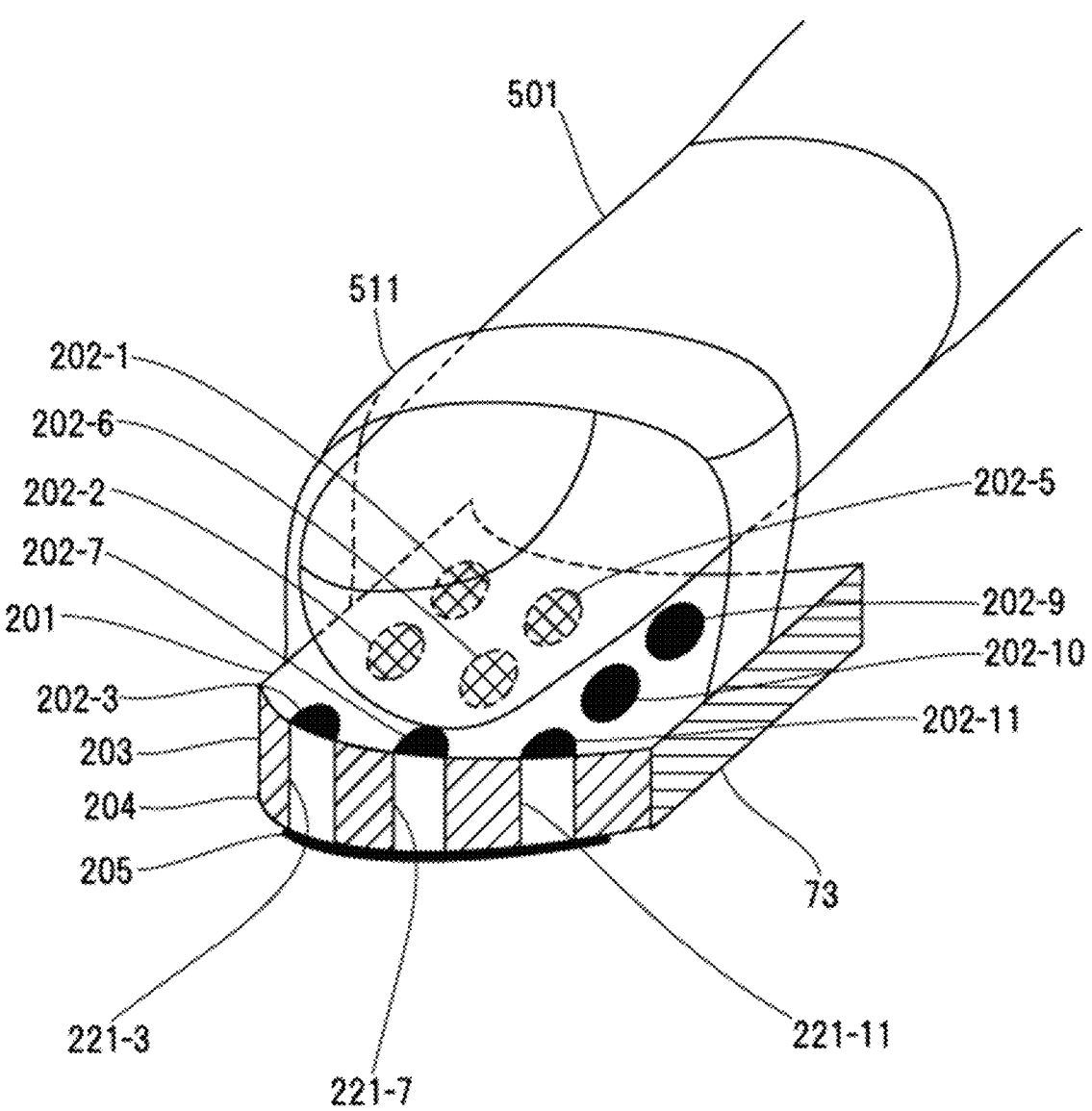
FIG. 11 shows a state of the tactile sensation generating pad 73 attached to the finger abdomen.

Next, an example of the use of the tactile sensation generating pad 73 as a device worn on the finger abdomen will be described. FIG. 11 shows the state of the tactile sense generating pad 73 attached to the finger abdomen. The tactile sensation generating pad 73 is attached to the finger 501 with the fixing band 511 so that the side surfaces of the electrodes 202-1 through 202-12 contact the skin 101 of the finger abdomen of the finger 501.

For example, the tactile sensation generating pad 73 as a device worn on the finger abdomen is approximately the same size as the finger 501, and its thickness is between 0.2 mm and 0.5 mm. The tactile sensation generating pad 73 is thin and flexible, so it fits the shape of the finger 501.

When an alternating voltage of 30 Hz to 500 Hz of sine, triangular or square waves is applied between all or any of the electrodes 202-1 to 202-12 and electrode 205, the tactile sensation generating pad 73 can generate individual 1.5 mm to 3 mm sized. The vibrations can be generated individually in a region to induce tactile sensations in the skin 101 of the finger abdomen of the finger 501.

Thus, the tactile sensation-generating pad 73 can be used alone as a skin stimulation device.

The materials used to form dielectric member 203, dielectric member 261 or dielectric member 311 include graphene, barium titanate, potassium, zinc oxide, MXene, $Zn_2$ TTFTB and $Cd_2$ TTBFT, $Ni_3$ (2,3,6,7,10,11-hexaiminotriphenylene)$_2$ [$Ni_3$ (HITP)$_2$], Zr-UiO-66, ZIF-67, and other MOF (Metal Organic Frameworks) materials such as Zr-UiO-66 and ZIF-67 can be added by 0.1% to 30% by weight to assist in charge accumulation in dielectric member 203, 261 or 311.

The holes 221, 271 or 321 can be filled with 0.5 to 50% by volume of graphene, barium titanate, potassium, zinc oxide, MXene or MOF material to assist in charge accumulation.

In addition, if an accumulator such as MXene, $Zn_2$ TTFTB and $Cd_2$ TTBFT, $Ni_3$ (2,3,6,7,10,11-hexaiminotriphenylene)$_2$ [$Ni_3$ (HITP)$_2$], Zr-UiO-66, ZIF-67 and other MOF materials such as dielectric member 203, dielectric member 261 or dielectric member 3 11 or in hole 221, hole 271 or hole 321, can be used without charging the tactile generation pad 73, tactile generation pad 251, tactile generation pad 301, tactile generation pad 351 or tactile generation pad 401 with an electric charge beforehand.

When molding the dielectric member 203, dielectric member 261, or dielectric member 311, 0.1 to 5% by weight of a foaming agent can be mixed to create bubbles inside to form each of the holes 221, holes 271, or holes 321 in the dielectric member 203, dielectric member 261, or dielectric member 311, respectively. The holes can be made to form holes 221, holes 271 or holes 321, respectively.

Potassium may be doped into thin plate glass, charged, and sandwiched between dielectric member 203, dielectric member 261 or dielectric member 311 and film 201 and film 204. Silica beads of 0.01 mm or 0.05 mm may be doped with potassium, mixed with silicone rubber, and charged to form dielectric member 203, dielectric member 261, or dielectric member 311.

The amplifier 35 can supply a burst signal-like voltage to the tactile sensation generating pad group 21 that is turned on and off at predetermined cycles, and is approximately 0 V during the off period and is a sine wave of predetermined frequency with predetermined voltage amplitude during the on period. The frequency at which the burst signal-like voltage supplied from amplifier 35 is turned on or off is between 30 Hz and 300 Hz. In other words, the on/off period of the burst signal voltage supplied from amplifier 35 is from 3 msec to 30 msec.

The holes 221, 271, or 321 are described as columnar in shape with a circular cross section, but they may be any shape, such as elliptical, elliptic, triangular, or polygonal such as square, and the shape of the cross section may change in the thickness direction of dielectric member 203, dielectric member 261, or dielectric member 311. The shape of the cross section may change in the direction of the thickness of dielectric member 203, dielectric member 261, or dielectric member 311.

Thus, it can be thinner and more flexible, and can apply a stimulus that causes a sense of touch to a desired part of the skin site at a desired time and for a desired period of time. The wearable device can also be used to apply a stimulus that causes tactile sensation to a desired part of the skin site at a desired time and for a desired period of time.

For example, stimuli can be generated to perceive object shapes and vibration patterns, such as vibration, impact sensation, force pressure, edge or bump shapes, etc.

Thus, the tactile generation pad group 21 uses one or more tactile generation pads 73, 251, 301, 351 or 401, and each of the tactile generation pads 73, 251, 301, 351 The piezoelectric film or fluorine-based film has a predetermined pattern of electrodes for tactile presentation, and each electrode independently generates tactile sensations. In order to make the pad 73, pad 251, pad 301, pad 351, or pad 401 also piezoelectric, a voltage is charged between the piezoelectric film or fluorine-based film to hold static electricity, and a bias frequency voltage is added to it to induce vibration. The voltage at the bias frequency is then added to induce vibrations.

As described above, the tactile generating pad 73 is a skin 101 stimulation device that applies stimulation to the skin 101. The film 201 bends when voltage is applied. A plurality of electrodes 202 are provided on one side of the film 201 in the form of a membrane. Each of the plurality of electrodes 202 is provided at a predetermined distance from each other. The film 204 flexes when voltage is applied. The electrodes 205 are provided on one side of the film 204 in the form of a film. Dielectric member 203 is molded from dielectric rubber in the form of a thin sheet with holes. The dielectric member 203 has the other side of the film 201 attached to the first side, which is a predetermined surface, and the other side of the film 204 attached to the second side, which is opposite the first side. When an AC drive voltage is applied between any or all of the electrodes 202 and the electrode 205, the part sandwiched between the electrodes 202 and 205 to which the voltage is applied vibrates in the tactile sensation generating pad 73.

In this way, it can be made thinner and more flexible, and can be used to apply stimuli that cause tactile sensations to a desired part of the skin site at a desired time and for a desired period of time.

The spacing between the plurality of electrodes 202 on one side of the film 201 can be less than the two-point identification threshold of human skin 101.

A predetermined voltage can be applied to the dielectric material 203 to precharge the charge.

The holes in the dielectric material 203 can be made to penetrate from the first surface to the second surface.

Any of the plurality of electrodes 202 and electrode 205 can be placed across the film 201 and film 204, and across the portion of the dielectric material 203 in which the holes are formed.

The shape of the cross section on the first face of the hole in the dielectric material 203 can be the same as the shape of the face of the membrane electrode 202.

The electrode 202 can be placed across the film 201 and on the cross-section of the hole in the dielectric material 203, which is the cross-section in the first plane.

Any of the plurality of electrodes 202 and electrode 205 can be placed across the film 201 and film 204, and across the portion of dielectric material 311 that is out of the area where the holes are formed.

Further springs 411-1 and 411-2 can be provided to press between the edges of the film 201, film 204 and dielectric member 203.

A plurality of electrodes 361 can be provided, and each of the plurality of electrodes 361 can be located opposite each of the plurality of electrodes 202.

The holes in the dielectric material 203 can be filled with an electrifying agent that assists in the accumulation of an electric charge.

When transmitting vibration as a stimulus in contact with skin 101, an air actuator 72 can be further provided to displace the film 201, electrode 202, film 204, electrode 205 and dielectric member 203 to press them against the skin 101.

In this way, it can be made thinner and more flexible to apply stimulation causing tactile and pressure sensations to desired areas of the skin site at desired times and for desired periods of time.

The air actuator 72 can be pressed against the skin 101 by displacing the film 201, electrode 202, film 204, electrode 205 and dielectric member 203 by gas or liquid pressure.

The cam 122 as the pressing means can displace the film 201, electrode 202, film 204, electrode 205 and dielectric member 203 to press them against the skin 101.

As a pressing means, the film 201, electrode 202, film 204, electrode 205, and dielectric member 203 can be displaced and pressed against the skin 101 by pulling with wire 152 via pulley 153.

A film 201 that bends when a voltage is applied, a plurality of membrane electrodes 202 provided on one side of the film 201 at a predetermined distance from each other, a film 204 that bends when a voltage is applied, a membrane electrode 205 provided on one side of the film 204, and a hole formed dielectric member 203, which is molded from dielectric rubber in the form of a thin sheet and includes a dielectric member 203 to which the other side of the film 201 is attached on a first side, which is a predetermined side, and the other side of the film 204 is attached on a second side opposite the first side, and an alternating drive voltage between any or all of the electrodes 202 and the electrodes 205. The pad can be driven to vibrate by applying a voltage of alternating current with a frequency of 30 Hz to 500 Hz between any or all of the electrodes 202 and the electrodes 205 of the tactile sensation generating pad 73, wherein the portion sandwiched between the electrodes 202 and the electrodes 205 to which the voltage is applied vibrates when a voltage is applied.

In this way, it can be made thinner and more flexible, and can be used to apply stimuli that cause tactile sensations to a desired part of the skin site at a desired time and for a desired period of time.

The invention is not limited to the embodiments described above, and various changes can be made to the extent that they do not depart from the gist of the invention.

Explanation of Signs

11 Tactile sensation presentation system, 21 Tactile sensation generating pads, 31 Computer system, 32 Tactile sensation detection system, 33 Vibration frequency calculation unit, 34 Digital data/analog data converter, 35 Amplifier, 41 Collision calculation unit, 42 Robot system, 52 Transducers, 53 Remote robot system, 71 71 and 71-1 to 71-4 tactile sensation generating units, 72 and 72-1 to 72-4 air actuators, 73 and 73-1 to 73-4 tactile sensation generating pads, 101 73 and 73-1 through 73-4 tactile pads, 101 skin, 121 and 121-1 through 121-4 tactile generating units, 122 and 122-1 through 122-4 cams, 123 and 123 and 123-1 through 123-4 motors, 151 and 151-1 through 151-4 tactile sensation generating units, 152 and 152-1 through 152-153, 153-1 through 153-4, 154 and 154-1 through 154-4 pulleys, 155 and 155-1 through 155-4 motor, 201 film, 202, 202-1 through 202-12 electrodes, 203 dielectric, 204 film, 205 electrodes, 221, 221-1 through 221 251 tactile pads, 261 dielectric member, 271, 271-1 through 271-9 holes, 301 tactile pads, 311 dielectric member, 321, 321-1 through 321-4 holes, 351 tactile pads, 311 dielectric member, 321, 321-1 through 321-4 holes, 351 tactile pads, 311-4 holes, 351 tactile pads, 361, 361-1 through 361-12 electrodes, 401 tactile pads, 411-1 and 411-2 springs, 501 fingers, 501 511 Fixing bands

The invention claimed is:

1. A skin stimulation device that applies stimulation to the skin, comprising:

a first film that bends when voltage is applied, a plurality of first electrodes in the form of a membrane are provided on one side of the first film, spaced apart from each other by a predetermined distance, a second film that bends when voltage is applied, a second electrode in the form of a film provided on one side of the second film, a dielectric member formed of dielectric rubber in the form of a thin plate having a hole formed therein, wherein the other side of the first film is attached to a first surface of the dielectric member, which is a predetermined surface, and the other side of the second film is attached to a second surface of the dielectric member, which is opposite the first surface, so that the dielectric member is disposed between the first film and the second film, and a capacitor material is placed in the hole formed in the dielectric member to assist in the accumulation of electric charge, wherein, the skin stimulation device is configured to apply an alternating current drive voltage between any or all of the first electrode and the second electrode across the first film, the dielectric member, and the second film to vibrate the portion sandwiched between the first electrode and the second electrode to which the voltage is applied.

2. The skin stimulation device according to claim 1, wherein the spacing between a plurality of first electrodes on one side of the first film is less than the two-point identification threshold of human skin.

3. The skin stimulation device according to claim 1, wherein a predetermined voltage is applied to the dielectric member to precharge the charge.

4. The skin stimulation device according to claim 1, wherein the hole formed in the dielectric member is a through-hole that penetrates from the first surface to the second surface.

5. The skin stimulation device according to claim 1, wherein any of the plurality of first electrodes and the second electrode are arranged so as to sandwich the first film and the second film and sandwich a portion of the dielectric member in which the hole is formed.

6. The skin stimulation device according to claim 5, wherein the shape of the cross-section in the first face of the hole formed in the dielectric member is the same as the shape of the face of the first electrode in membrane form.

7. The skin stimulation device according to claim 6, wherein the first electrode is positioned across the first film and on the cross-section of the hole in the dielectric member at the first surface.

8. The skin stimulation device according to claim 1, wherein any of the plurality of first electrodes and the second electrode are arranged so as to sandwich the first film and the second film and sandwich a portion of the dielectric member that is out of a portion in which the hole is formed.

9. The skin stimulation device according to claim 1, further comprising pressing means for pressing between the edges of first film, second film and dielectric member.

10. The skin stimulation device according to claim 1, wherein a plurality of second electrodes are provided, and each of the plurality of second electrodes is provided in a position opposite to each of the plurality of first electrodes.

11. The skin stimulation device according to claim 1, further comprising means for pressing the first film, the first electrode, the second film, the second electrode and the dielectric member against the skin by displacing the first film, the first electrode, the second film, the second electrode and the dielectric member when vibration is transmitted as stimulation by contacting skin.

12. The skin stimulation device according to claim 11, wherein the pressing means displaces and presses the first film, the first electrode, the second film, the second electrode and the dielectric member against the skin by gas or liquid pressure.

13. The skin stimulation device according to claim 11, wherein the pressing means displaces and presses the first film, the first electrode, the second film, the second electrode and the dielectric member against the skin by means of a cam.

14. The skin stimulation device according to claim 11, wherein the pressing means displaces and presses the first film, the first electrode, the second film, the second electrode and the dielectric member against the skin by pulling with a wire via a pulley.

15. A method for driving a skin stimulation device that applies stimulation to the skin, comprising:

applying an alternating current drive voltage between any or all of a plurality of first electrodes and a second electrode of a skin stimulation device to vibrate the skin stimulation device, wherein the skin stimulation device comprises a first film that bends when voltage is applied, a plurality of first electrodes in film form provided on one side of the first film at a predetermined distance from each other, a second film that bends when voltage is applied, a second electrode in film form provided on one side of the second film, a second electrode in film form with holes formed in it, a dielectric member, which is molded from dielectric rubber in the form of a thin plate having holes formed therein, and includes a first surface, which is a predetermined surface, to which the other side of the first film is attached, and a second surface opposite the first surface to which the other side of the second film is attached, so that the dielectric member is disposed between the first film and the second film and the alternating current drive voltage applied between any or all of the plurality of first electrodes and the second electrode is applied across the first film, the dielectric member, and the second film, and a capacitor material placed in the hole formed in the dielectric member to assist in the accumulation of electric charge, wherein a portion sandwiched between any or all of the plurality of first electrodes and the second electrode to which the alternating current drive voltage is applied vibrates when the alternating current drive voltage is applied between any or all of first electrode and the second electrode of the skin stimulation device.

* * * * *